J. H. DEAN.
VOTING MACHINE.
APPLICATION FILED NOV. 20, 1905.
1,084,073.
Patented Jan. 13, 1914.
11 SHEETS—SHEET 2.
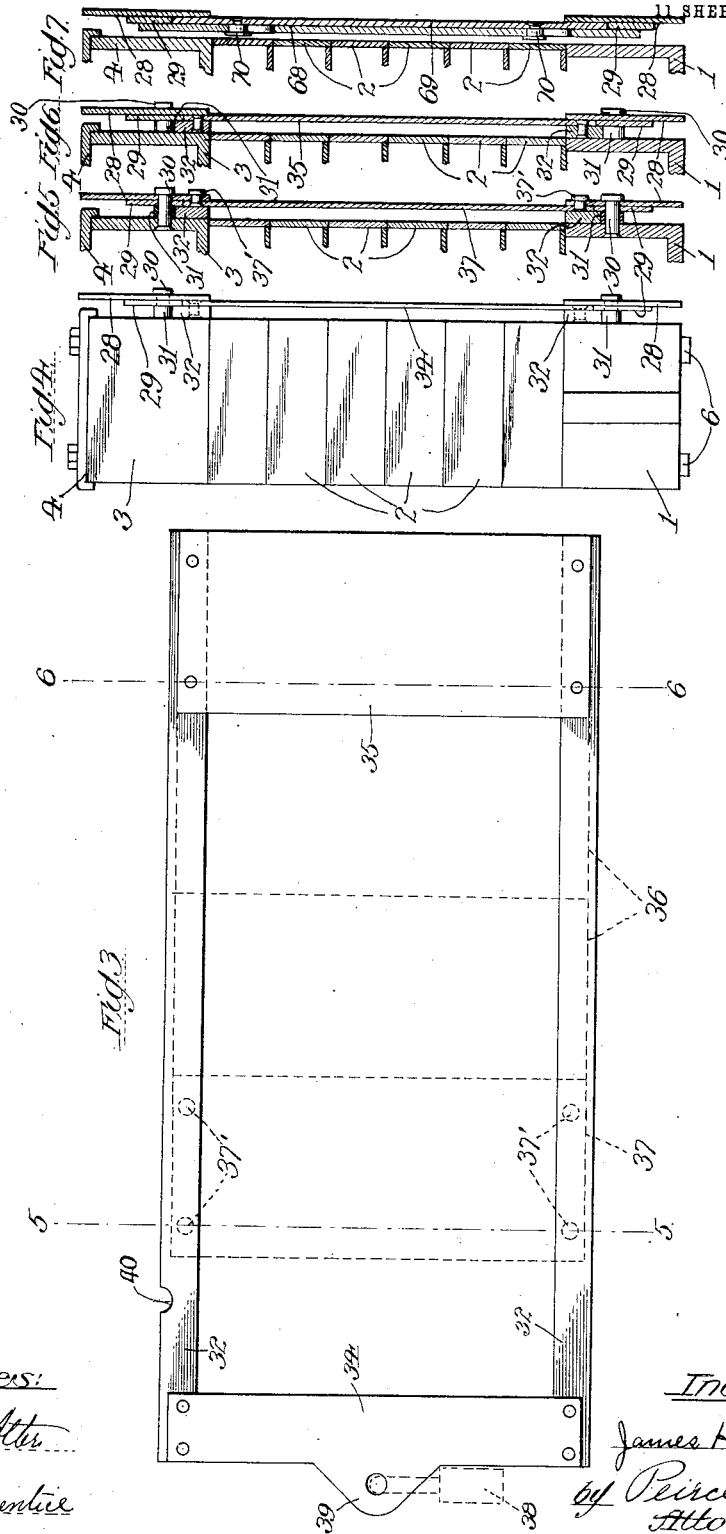
Witnesses:
Inventor:
James H. Dean
by Peirce & Fisher
Attorneys J. H. DEAN.
VOTING MACHINE.
APPLICATION FILED NOV. 20, 1905.
1,084,073.
Patented Jan. 13, 1914.
11 SHEETS—SHEET 3.
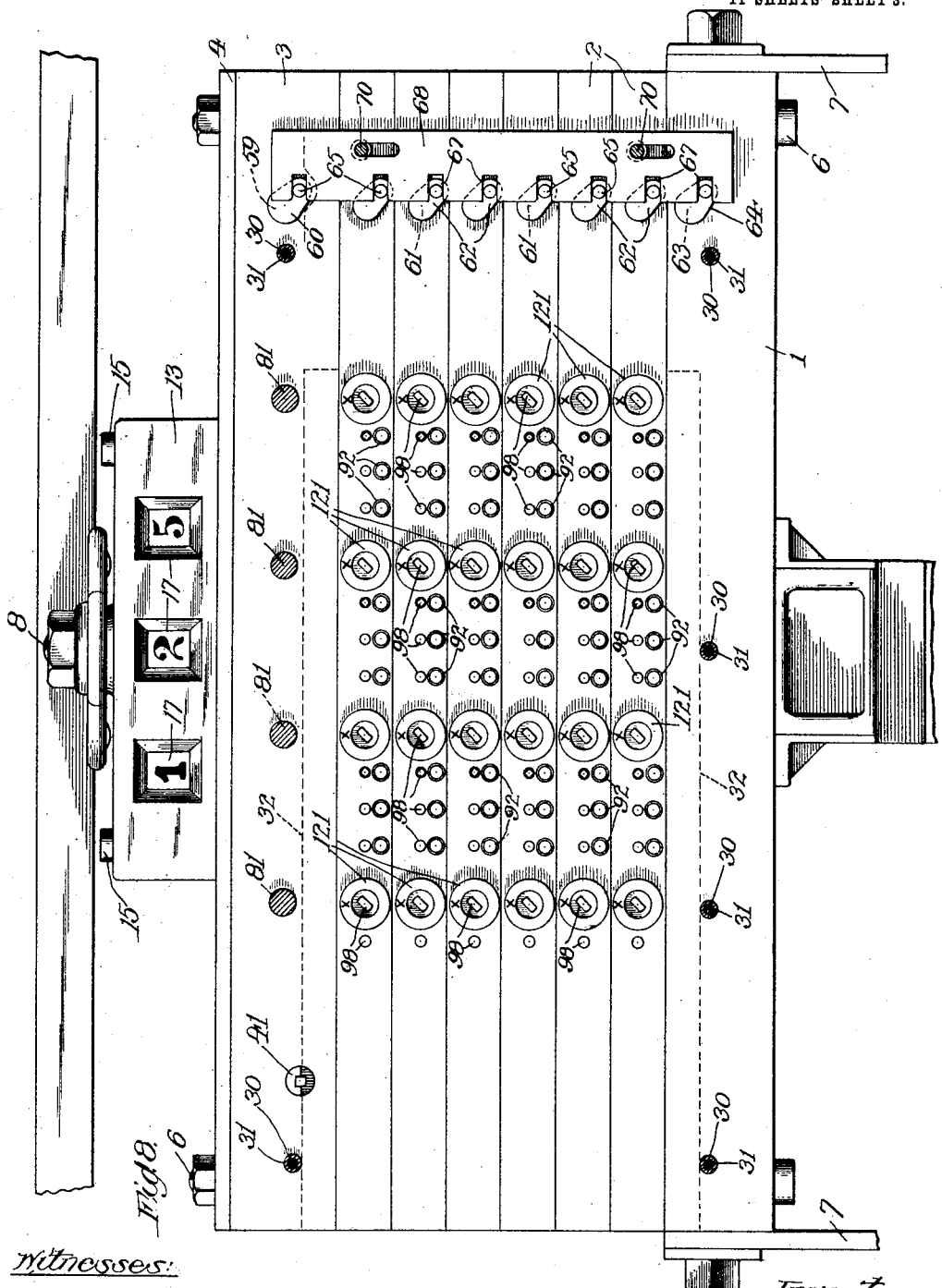

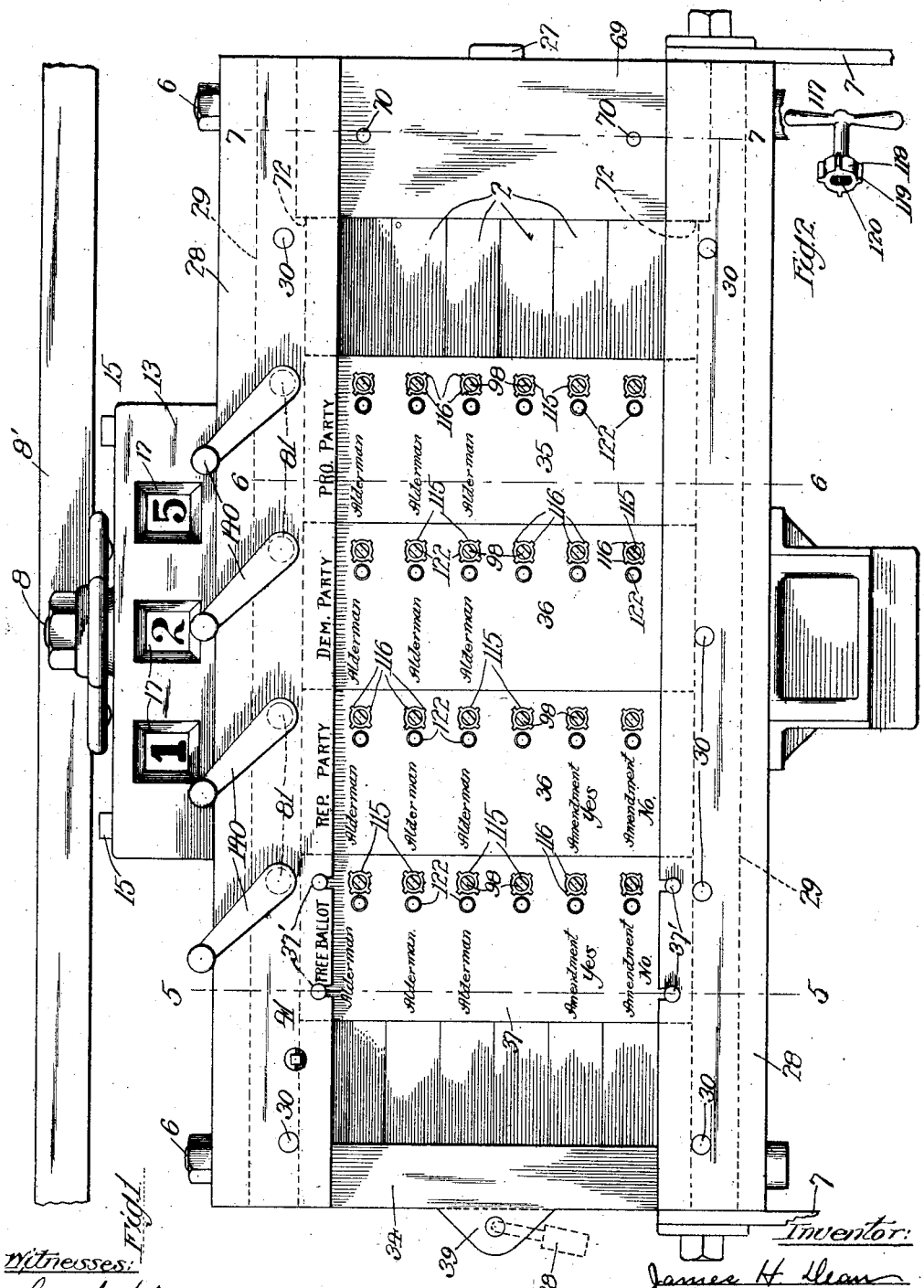

J. H. DEAN.
VOTING MACHINE.
APPLICATION FILED NOV. 20, 1905.
1,084,073. Patented Jan. 13, 1914.
11 SHEETS—SHEET 4.
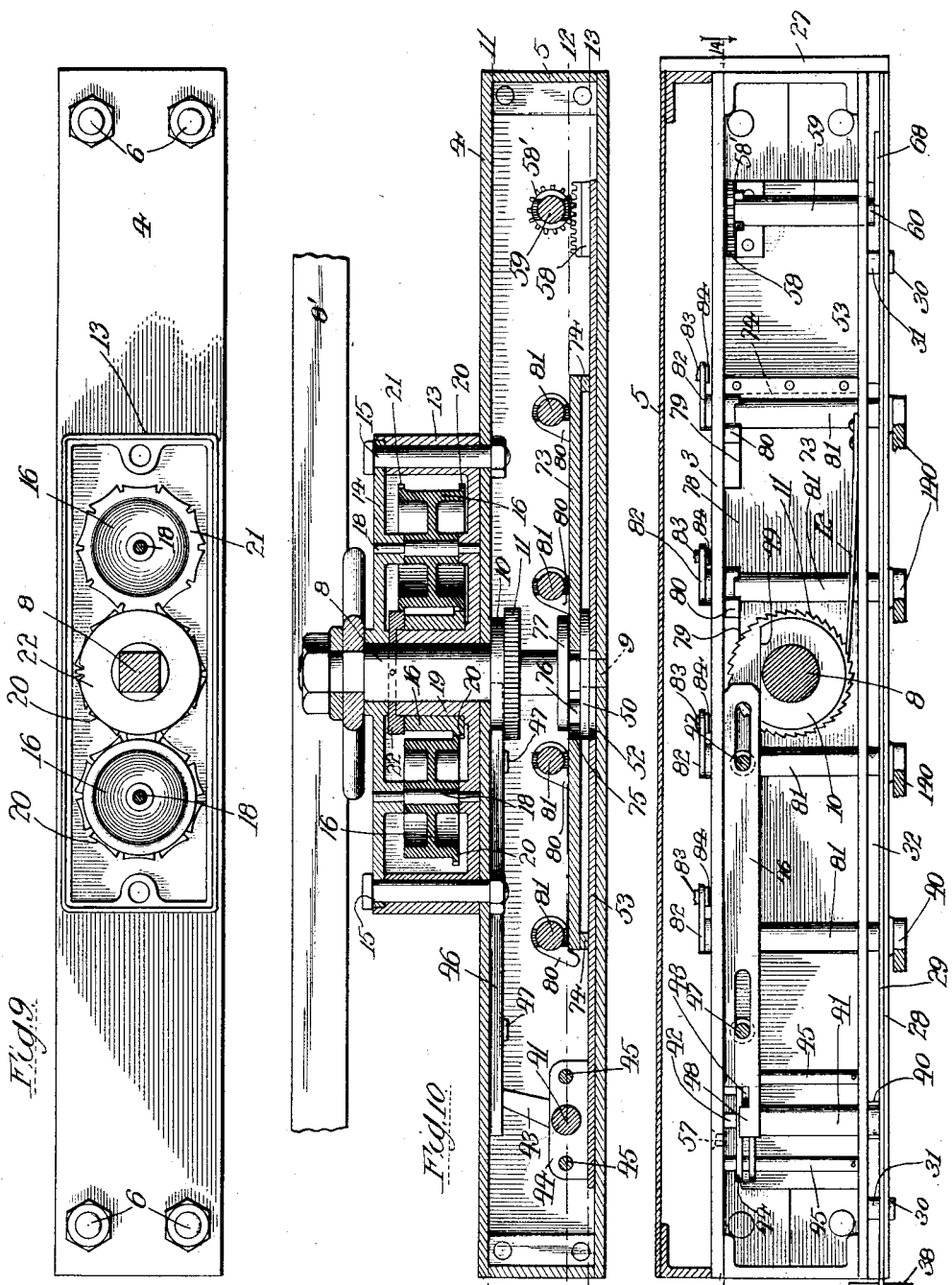

J. H. DEAN.
VOTING MACHINE.
APPLICATION FILED NOV. 20, 1905.
1,084,073.
Patented Jan. 13, 1914.
11 SHEETS—SHEET 5.
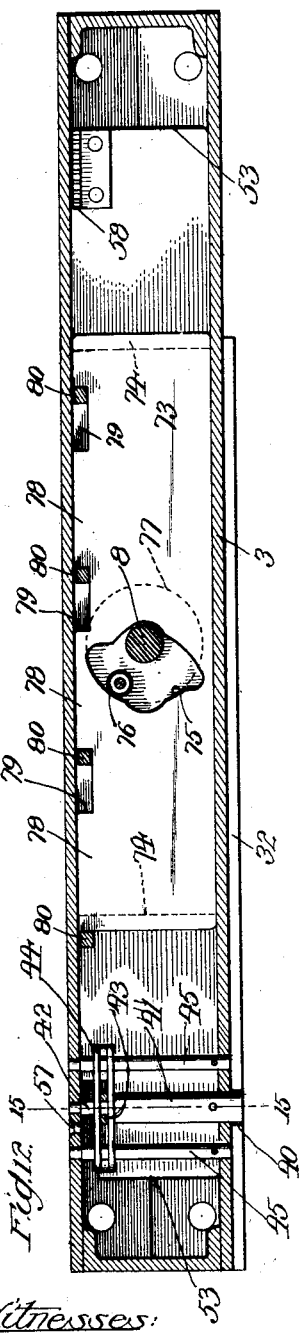
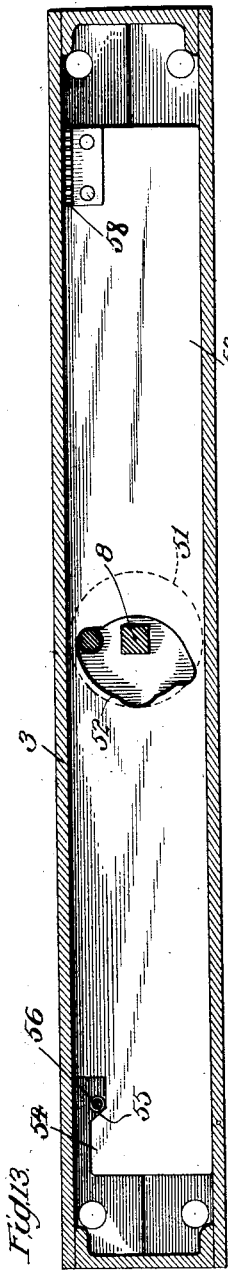
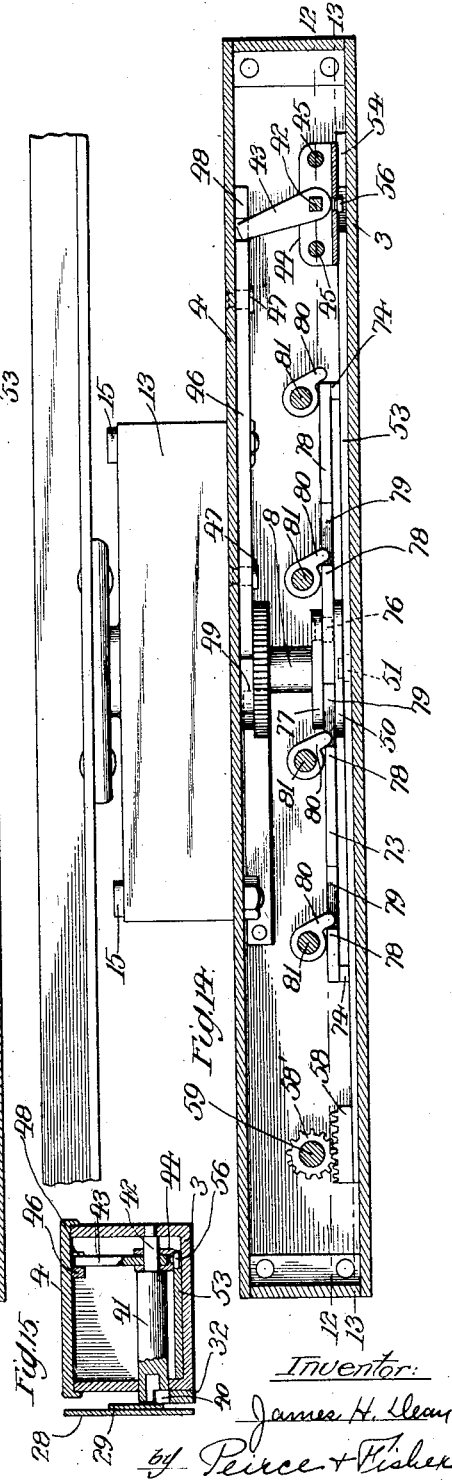

J. H. DEAN.
VOTING MACHINE.
APPLICATION FILED NOV. 20, 1905.
1,084,073.
Patented Jan. 13, 1914.
11 SHEETS—SHEET 6.
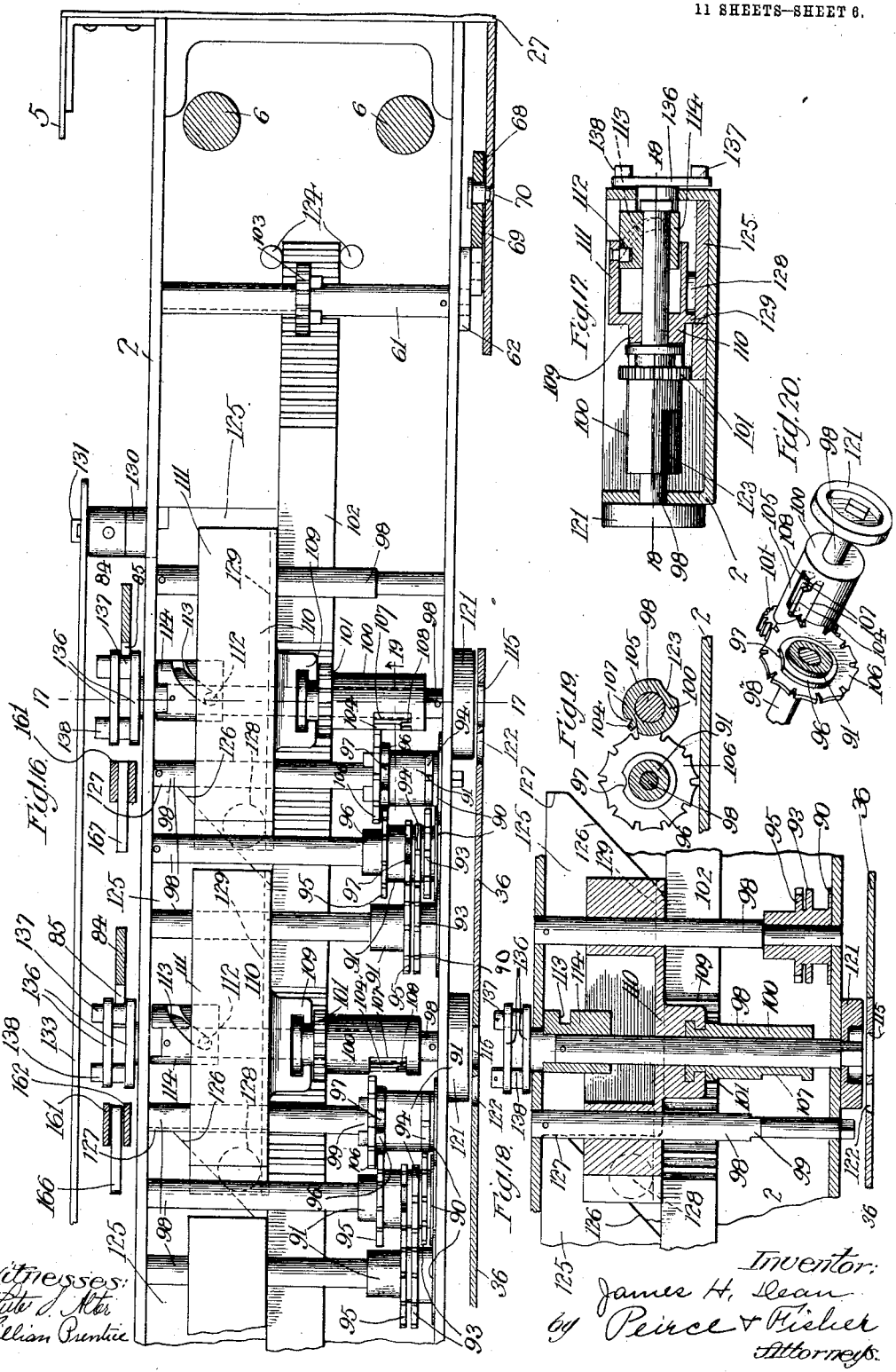

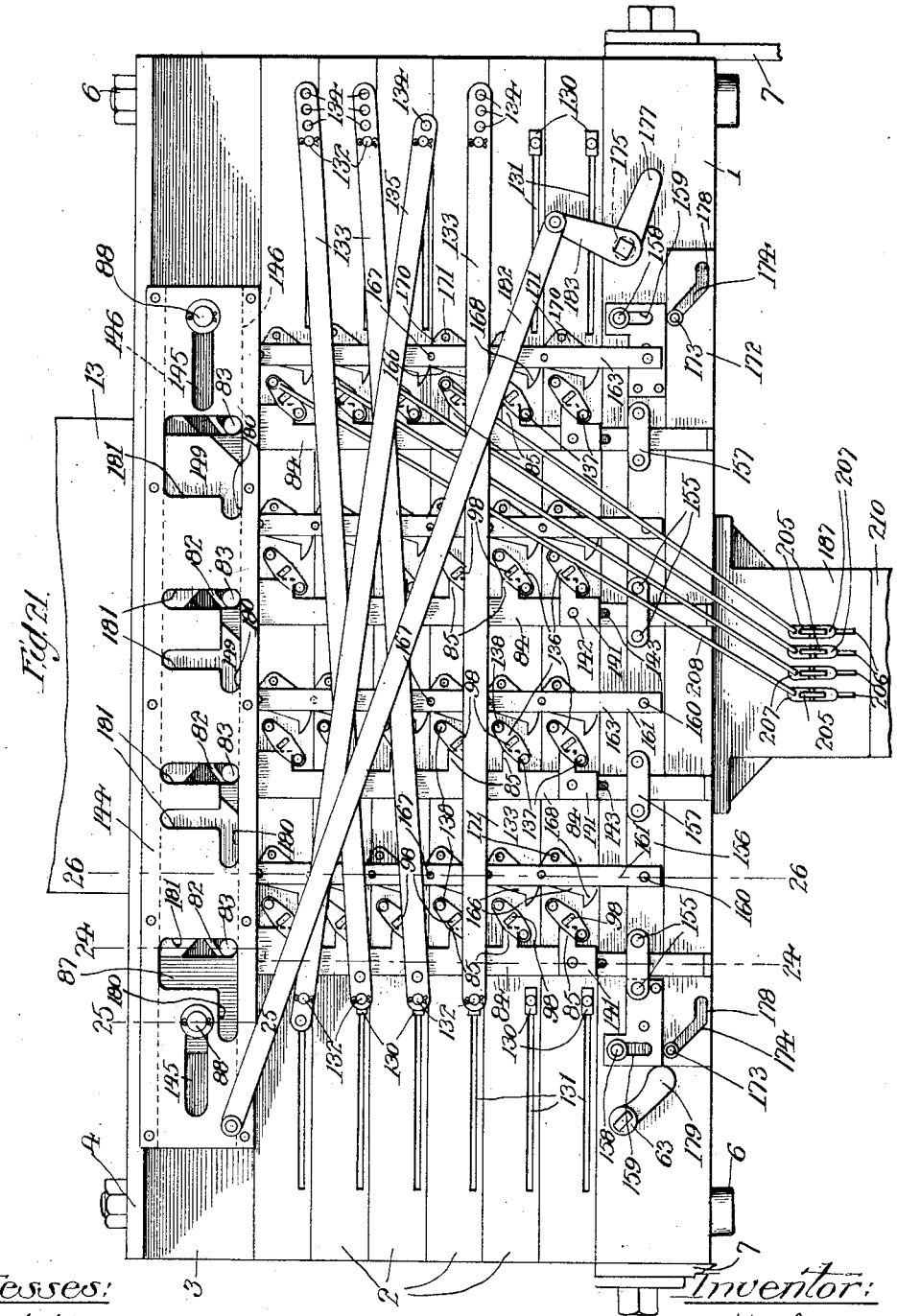

J. H. DEAN.
VOTING MACHINE.
APPLICATION FILED NOV. 20, 1905.
1,084,073.
Patented Jan. 13, 1914.
11 SHEETS—SHEET 8.
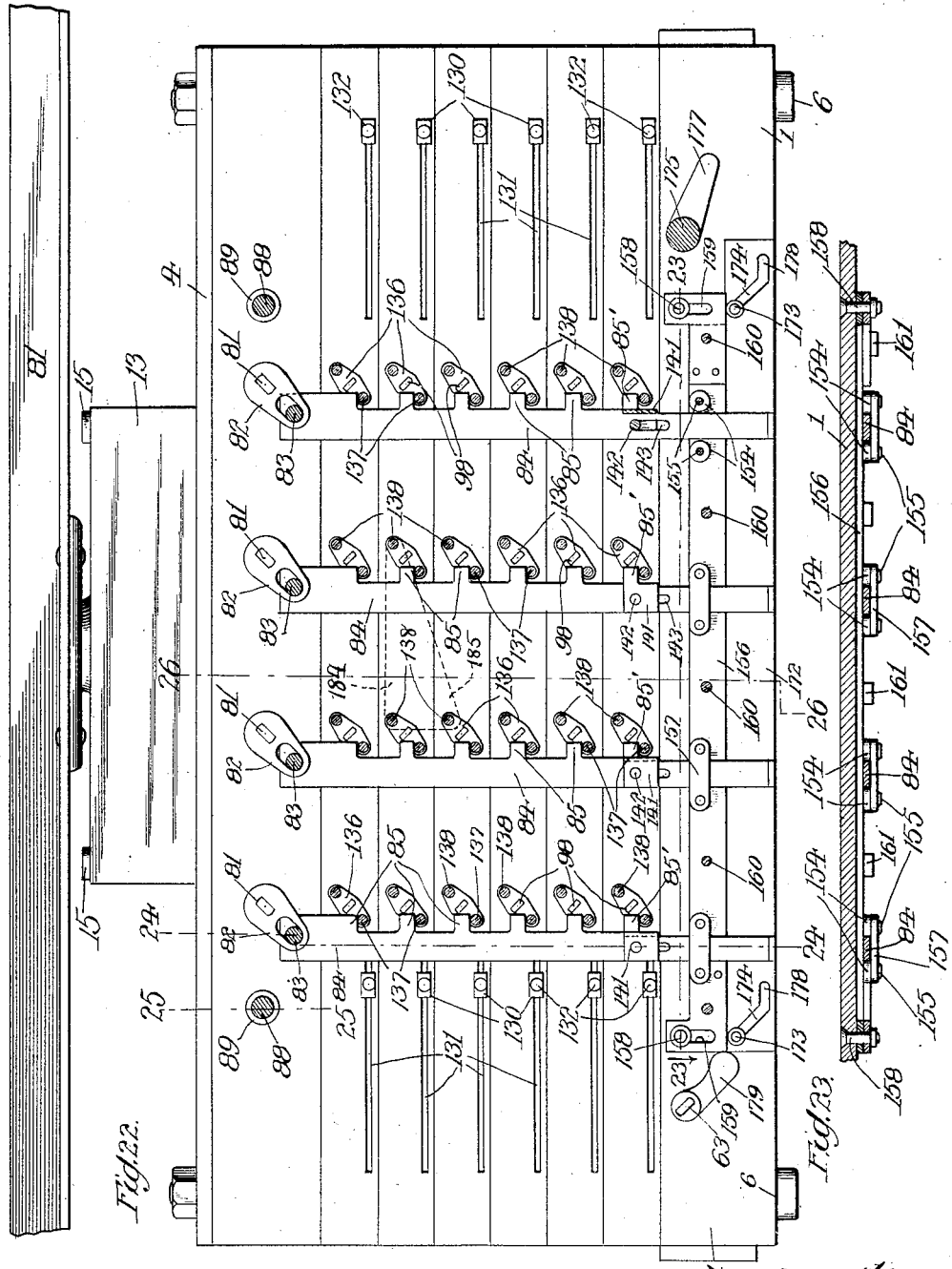

J. H. DEAN.
VOTING MACHINE.
APPLICATION FILED NOV. 20, 1905.
1,084,073.
Patented Jan. 13, 1914.
11 SHEETS—SHEET 9.
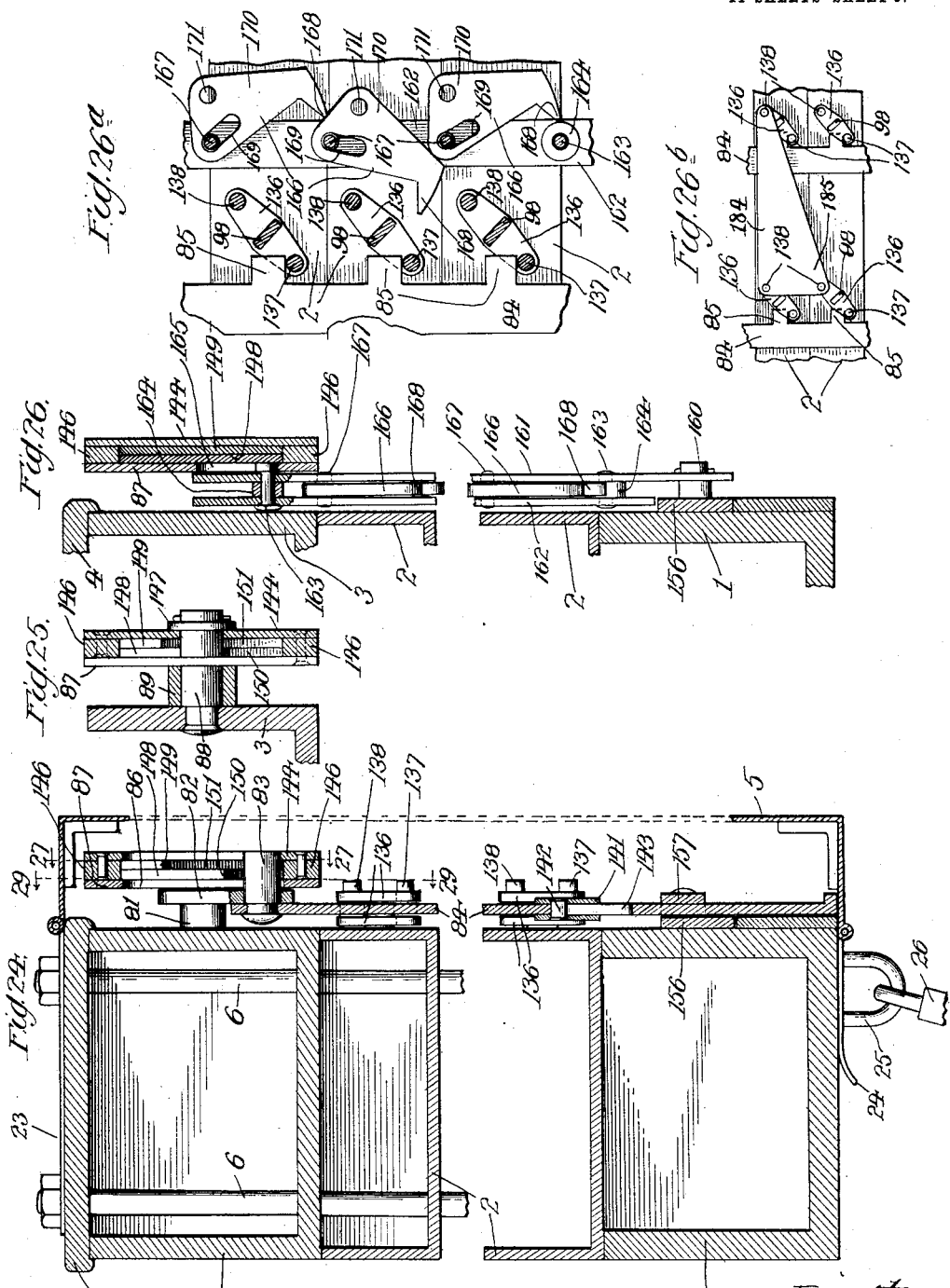

J. H. DEAN.
VOTING MACHINE.
APPLICATION FILED NOV. 20, 1905.
1,084,073.
Patented Jan. 13, 1914.
11 SHEETS—SHEET 10.
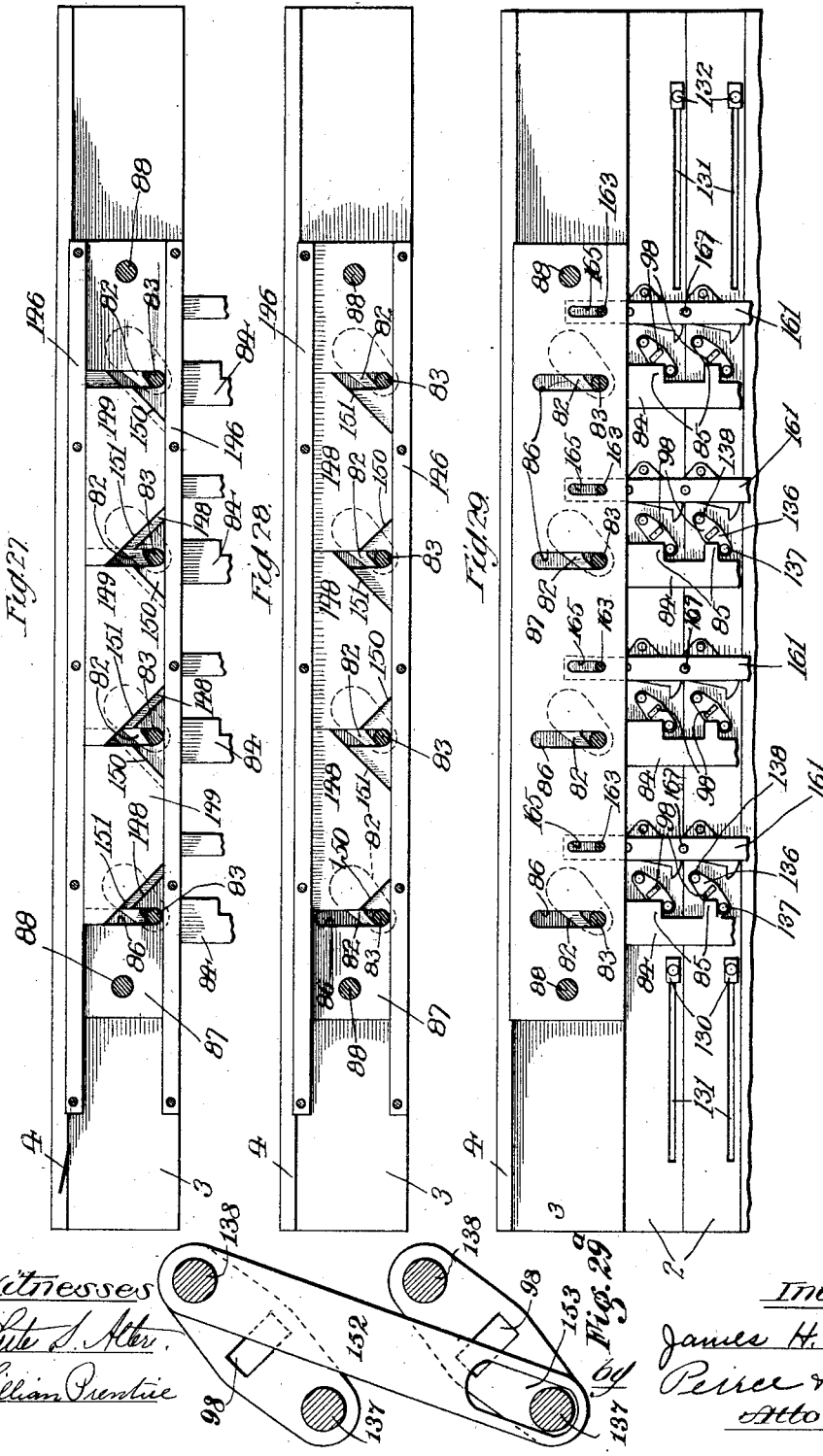

J. H. DEAN.
VOTING MACHINE.
APPLICATION FILED NOV. 20, 1905.
1,084,073.
Patented Jan. 13, 1914.
11 SHEETS—SHEET 11.
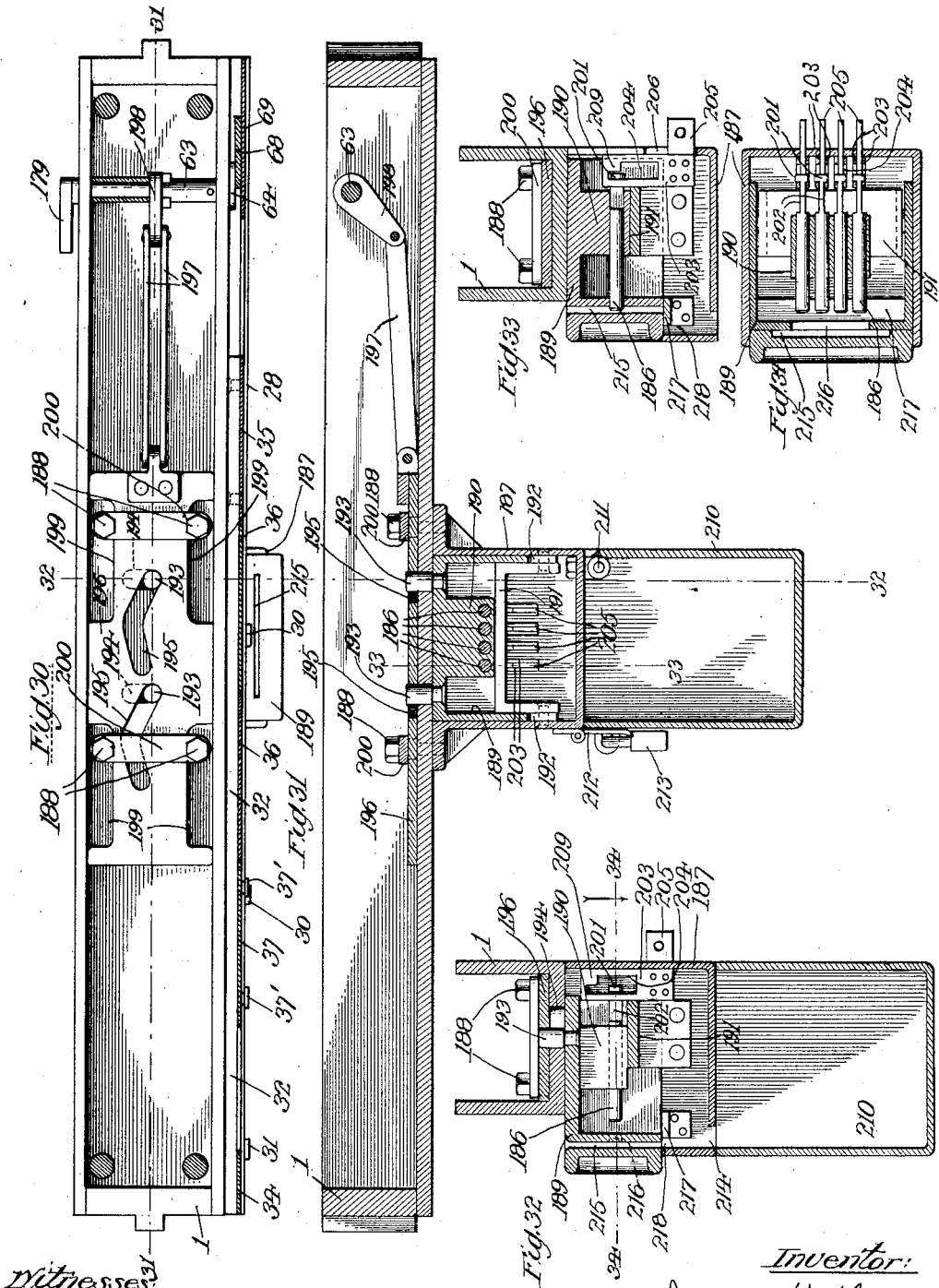

UNITED STATES PATENT OFFICE.

JAMES H. DEAN, OF CHICAGO, ILLINOIS, ASSIGNOR, BY MESNE ASSIGNMENTS, TO EMPIRE VOTING MACHINE COMPANY, A CORPORATION OF NEW YORK.

VOTING-MACHINE.

1,084,073.  Specification of Letters Patent.  Patented Jan. 13, 1914.

Application filed November 20, 1905. Serial No. 288,185.

*To all whom it may concern:*

Be it known that I, JAMES H. DEAN, a citizen of the United States, and a resident of Chicago, county of Cook, and State of Illinois, have invented certain new and useful Improvements in Voting-Machines, of which the following is declared to be a full, clear, and exact description.

The improvement relates to voting machines and seeks to provide a construction readily adapted for use at different elections and in which provision is made for casting straight ticket or irregular ballots, for special class voting and indorsing candidates arranged in multi-candidate group.

Other objects of the invention are to simplify and improve parts of the machine so that they cannot get out of order or be capable of improper manipulation.

The invention consists in the features of construction, combinations and arrangements of parts hereinafter set forth, illustrated in the accompanying drawings and more particularly pointed out in the appended claims.

In the drawings, Figure 1 is a view of the face of the machine. Fig. 2 is a perspective view of the voter's key. Fig. 3 is a view in elevation of the name-plate slide mounted at front of the machine. Fig. 4 is an end view. Figs. 5, 6 and 7 are detail sections through the front of the machine casing taken on lines 5—5, 6—6 and 7—7 respectively of Figs. 1 and 3. Fig. 8 is a view similar to Fig. 1 with the front face plates removed. Fig. 9 is a plan view of the top of the machine with the upper plate of the total counter casing removed. Fig. 10 is a vertical section through the top unit of the machine. Fig. 11 is a plan view thereof with the top plate removed, certain parts being shown in section on line 11—11 of Fig. 10. Figs. 12 and 13 are horizontal sections of the upper unit or portion of the machine casing taken on lines 12—12 and 13—13 respectively of Figs. 10 and 14. Fig. 14 is a vertical section on line 14—14 of Fig. 11. Fig. 15 is a cross section on line 15—15 of Fig. 12. Fig. 16 is a plan view of one of the machine units or sections. Fig. 17 is a cross section thereof on line 17—17 of Fig. 16. Fig. 18 is a horizontal section on line 18—18 of Fig. 17. Fig. 19 is a detail section on line 19—19 of Fig. 16. Fig. 20 is a perspective view of the counter actuator and parts operated thereby. Fig. 21 is an elevation of the back of the machine with the rear cover-plate removed. Fig. 22 is a similar view with certain of the parts removed and certain parts shown in section. Fig. 23 is a detail section on line 23—23 of Fig. 22. Figs. 24, 25 and 26 are detail views of the mechanism at the rear face of the machine taken on lines 24—24, 25—25 and 26—26 respectively of Fig. 22. Fig. 27 is a rear view of the interlocking devices for the straight ticket mechanisms with the outer plate thereof removed, that is to say, the view is a section on line 27—27 of Fig. 24. Fig. 28 is a similar view with the outer row of wedge-blocks removed. Fig. 29 is a detail section on line 29—29 of Fig. 24. Fig. 30 is a plan view of the lower section, but with the parts mounted on the rear face thereof removed. Fig. 31 is a longitudinal section on line 31—31 of Fig. 30. Fig. 32 is a cross section on line 32—32 of Figs. 30 and 31. Fig. 33 is a cross section on line 33—33 of Fig. 31. Fig. 34 is a section on line 34—34 of Fig. 32.

The machine shown in the drawings, like that set forth in my prior Patent No. 636,730 and dated November 7, 1899, is made up of units or sections, but it is to be understood that numerous features of the present invention are not dependent on the sectional and unit arrangement and may be applied to machines of other types.

Each of the machine units contains counters representing the candidates for a single office and are placed one upon the other between the base and top sections. As many machine units are employed as are required for the number of offices to be filled at an election. The base and top sections and the units or single candidate group sections are used without change at the different elections. The parts at the front and rear of the machine frame alone have to be changed when the number of units is increased or diminished. As stated, the single candidate group sections or machine units, are arranged in horizontal rows, one upon the other while the party tickets are arranged in vertical rows. This arrangement however, may be altered without departure from the essentials of the invention.

The frame of the machine is preferably formed of sheet-metal and comprises the base frame or section 1, the unit or office section frames 2, the top frame or section 3, the top plate 4 and the sheet-metal back 5, which latter part serves to protect and conceal the operating, and other parts on the backs of the unit frames or sections.

The sections may be held together in any suitable way as by means of through-bolts 6, which extend through the sections and through the top plate 4. The sections may also be interlocked, if desired, in any suitable way. The frame as a whole, is carried at a proper height above the floor upon legs or supports 7, the upper portions only of which are shown in Figs. 1 and 8. The top and bottom sections and the intermediate machine units are preferably trough-shaped, having bottom, side and end walls with open tops, each however being closed by the bottom of the section or unit above it. The top section is closed by the plate 4. The parts of the frame are rigidly connected by the tie-bolts 6 and support the booth of the machine. This booth is preferably a curtain hung from a bow-shaped rod which is carried upon a cross arm 7 centrally journaled at the top of the machine. This arrangement of the booth-curtain is shown in a companion application filed by me and need not be more fully set forth here. The booth-carrying arm 7 is fixed to the upper end of a short stub shaft 8 (see Figs. 10 and 11) that is journaled in the top section 3 of the machine. The lower end of the shaft is provided with a reduced portion 9 that sets within a socket in the bottom of the section 3 and with a collar 10 that abuts against the under face of the top plate 4. A ratchet 11 fixed to the shaft beneath the collar 10, is arranged to be engaged by a spring pawl 12 fixed to the side of the section 3, and which prevents the rotation of the shaft 8 in one direction.

It will be understood that normally the bar 8' is in position with the curtain at the back of the machine and with the face of the latter, which carries the keys exposed. The bar 11 and shaft 8 are rotated through a half revolution to inclose the face of the machine and conceal the voter when the latter is to cast his ballot. When the voter leaves the machine, the booth-supporting arm 8' and shaft 8 are swung through another half revolution in the same direction back to normal position. The arm 8' and shaft 8 constitute the motor for the machine and are arranged to release the voting mechanisms during their first half revolution to restore the same during their second half revolution and to effect the operation of the vote counters or registers as will presently appear.

The motor shaft 8 is preferably provided with a total counter to register the number of voters. This counter is arranged within an open-top box or casing 13 mounted upon the top plate 4 of the machine and provided with a cover plate 14. Bolts 15 extend through the cover plate 14, casing 13 and top plate 4 and hold the parts in place. The nuts on the bolts 15 are arranged within the top section as shown, so that the casing of the top counter cannot be open, except by dismantling the machine. Three cylindrical wheels 16 are provided having numerals on their peripheral surfaces which are exposed through openings 17 (see Fig. 1) in the front wall of the total counter casing. The units and tens wheels are mounted upon cross studs 18, the reduced ends of which are journaled in the bottom of the casing 13 and in the top plate 14. The hundreds wheel is journaled on a central boss 19 rising from the bottom of the box or casing 13, and surrounding the motor shaft 8. The units wheel drives the tens wheel and the latter drives the hundreds wheel by means of intermittent, Geneva stop movement gears 20 mounted upon the lower ends so that they are constantly interlocked with one another and can only be driven by imparting movement to the units wheel. This wheel is provided with an intermittent gear 21 on its upper end which is arranged to be engaged by a gear 22 fixed to the shaft 8, and which has a single tooth and a cylindrical locking surface coöperating with the teeth of the gear 21 on the units wheel. The units wheel is thus constantly interlocked with the motor shaft 8 and must necessarily show at the end of an election the number of times that the shaft 8 has been rotated to operate the voting mechanisms. When the machine is dismantled by the proper official, the bolts 15 and cover plate 14 can be removed so that gear 22 may be disengaged from its companion wheel 21 on the units wheel and thus permit the setting of the total counter at zero.

The back casing 5 which incloses certain connecting and operating parts extending between the sections, is hinged at its upper end to straps 23 (see Fig. 24), which extend beneath and are held in place by the nuts on the bolts 6. The lower edge of the back casing is provided with a hasp 24 which fits over a loop 25 on the bottom of the lower section 1. A pad-lock 26 prevents removal of the back casing, except by the city clerk or other proper official. The back casing 5 is provided at one end with a forwardly projecting lug 27 (see Figs. 1 and 11) which engages the end of the main frame and extends beyond the front face thereof. The back casing 5, pad-lock 26 and forwardly projecting lug 27 constitutes the city clerk's lock and is arranged, as will presently appear, to prevent any interference with the ordinary operation of the machine, except by the city clerk or other proper official having the key to the pad-lock 26.

A pair of longitudinal strips 28 and 29

(see Figs. 1, 4, 5 and 6) are arranged in front of the top section 3 and parallel to the face thereof. These strips are carried upon pins 30 projecting forwardly from the front wall of the top section 3, but the strips are separated from the front face of the section by spacing thimbles 31 mounted on the pins. The lower edge of the strip 29 is arranged above that of the strip 28 as shown. A similar pair of plates are mounted in a like manner upon the lower section 1. Here the upper edge of the strip 29 is below that of the plate 28. Behind the strips 28 and 29 is arranged a sliding frame comprising the longitudinal bars 32 (see Fig. 3) connected at one end by a cross strip 34 and at the other end by a plate 35. The bars 32 of the frame slide snugly between the front face of the top and bottom sections of the frame and the strips 29, while the strip 34 and plate 35, which are secured to the front faces of the bars 32, are in line with and abut against the edges of the strips 29 and engage the inner faces of the strips 28. The frame is securely held against any vertical shift by the pins 30, since the sleeves 31 thereon engage the upper and lower edges of the frame bars 32. As stated, the voting mechanisms representing the single candidates are arranged in horizontal rows, while the party tickets preferably appear in vertical rows upon the face of the machine. The plate 35 is arranged to cover the party ticket appearing on the face of the machine at the extreme right hand end and normally conceals the counters of that party ticket. Other party group plates 36 for normally concealing the remaining counters, are arranged to slide between the bars 32 of the sliding frame and the longitudinally extending strips 28. The edges of these plates abut against the edges of the guide strips 29. The voting mechanisms in the vertical row at the extreme left of the machine are preferably employed for the casting of free ballots for irregular candidates and not provided with counters. Opposite this row of voting mechanisms, but in front of the bars 32 of the slide frame, is arranged a plate 37 which is provided with pins 37' arranged to engage open-ended slots in the adjacent edges of the longitudinal strips 28. By this arrangement, the plate 37 is held in fixed position. It will be noted that the strip 34 and plate 35, which are fixed to the bars 32 of the sliding frame, the plate 37 which is fixed to the stationary frame and the loose slide plates 36, are all arranged in the same plane (see Fig. 30) between the guide strips 29. When the machine is prepared for an election, the loose plates 36 will be held against movement between the plate 35 on the sliding frame and the fixed plate 37. The bars 32 of the sliding frame are of such length that, when the loose plates 36 are thus held against movement, the strip 34 will be separated from the edge of the fixed plate 37 and the outer end of the sliding frame will be in line with the end of the main frame so that it can be held against movement toward the right by a pad-lock 38 extending through a lug 39. The frame is of course held against movement toward the left by the fixed plate 37.

The key of the pad-lock 38 is held by the judge of election and on its removal, the sliding frame together with plate 35 may be shifted toward the right until arrested by the engagement of the strip 34 with the fixed plate 37 to expose the right hand row of counters. The loose plates 36 may then be suitably shifted to expose the other rows of counters.

Means are preferably provided which compels the locking of the counters against further operation when the sliding frame is shifted to expose them. For this purpose, the upper bar 32 of the sliding frame has a semi-circular notch 40 (see Fig. 3) in its upper edge within which projects the outer end of a cross shaft 41 journaled in one end of the top frame section 3 (see Figs. 12 and 15). By this means the sliding frame is normally held against movement but the end of the shaft is cut away so that in one position thereof, the frame is free and may be shifted to expose the counters in the manner described.

The shaft 41 has a reduced squared portion 42 at its inner end upon which is mounted an upwardly extending rock-arm or trip 43 (see Figs. 10, 11, 12, 14 and 15). This trip may be slid longitudinally on the squared portion 42 of the shaft and is mounted between the sides of a slide 44 that is U-shaped in section and carried upon a pair of cross studs or pins 45. The upper end of the trip 43 is arranged to engage the end of a sliding bolt 46 that is carried upon the under sides of the top plate 4 by a pair of pins 47 engaging slots therein (see Figs. 11 and 14). In its forward position the trip is also arranged to engage a hook-shaped lug or abutment 48 on the end of the bolt 46. The latter coöperates with a locking surface 49 on the collar 10 of the motor shaft 8, to lock the motor devices and prevent further operation of the counting mechanism.

When the slide 44 is in its forward position the end of the trip 43 will be located as shown in Fig. 11, between the hooked lug 48 and the end of the locking bar 46, so that the locking bolt may be shifted by the trip in opposite directions to alternately lock and release the motor devices. Only when the shaft 41 is turned to shift the bolt 46 to locked position, is the cut-away portion at the outer end thereof in position to permit the shift of the sliding frame so that the counters can only be exposed when locked against movement. When the machine is prepared for election, the slide 42 and trip 43 are set in their forward position so that before the voting commences the judge of election may turn the shaft 41 to lock the motor mechanism and thereby expose the counters to show interested parties that they are all at zero. The shift of the sliding frame to the right to expose the counters, is limited by the engagement of the strip 34 thereon to the fixed plate 37 and in this position the top bar of the frame holds the shaft 41 and it cannot be turned to release the motor mechanism and thereby permit operation of the machine until the slide frame and plates 35 and 36 have been returned to the position in which they conceal the counters. The judge may then release the bolt 46 by turning the shaft 41 in the opposite direction to bring trip 43 into engagement with the hooked lug 48 of the bolt. This operation may be repeated as many times as is desired before balloting commences, but it will be seen that the counters must be concealed before the motor devices are released for operation.

The short motor shaft is provided adjacent its lower end with a collar 50 (see Fig. 14) having a pin 51 on its lower face which engages a cam slot 52 in a sliding plate 53 (see Fig. 13). Plate 53 is guided between the front and back walls of the top section 3 and slides upon the bottom thereof and below the collar on disk 50. At its left hand end the plate is provided with a lug 54 (see Fig. 13) having an inclined cam-face 55 that is arranged to engage a pin 56 (see Figs. 14 and 15) on the under side of the U-shaped slide 44, which carries the trip 43. Shaft 8 can only rotate toward the right as described, and when so moved, pin 51 is arranged to shift the plate 53 toward the right and the cam-face 55 acts on pin 56 to move slide 44 and trip 43 to their rearmost position. In this position, the trip 43 will still engage the end of the bolt 46 to move it into locked position, but the trip cannot engage the hooked lug 48 to release the locking bolt. By reason of this arrangement, the election judge may, as described, expose the counters before balloting commences without permanently locking the operating or motor mechanism, but after balloting commences, i. e. after the machine has been operated, the trip 43 is thrown to its rearmost position, as described, and the count cannot be again exposed without permanently locking the motor mechanism and counters operated thereby.

The rear wall of section 3 is provided with an opening 57 (see Fig. 12) opposite the slide 44, through which the city clerk or other proper official may insert a rod to set the slide and trip in their forwardmost position when the machine is prepared for an election. This cannot be done by any unauthorized individual, inasmuch as the back casing 5, which is under control of the city clerk's lock, normally covers the opening 57 (see Fig. 11).

The sliding plate 53 forms part of the motor mechanism for the machine and carries at its right hand end a short rack 58 which engages the teeth of the pinion 58' on the inner end of a cross stud or shaft 59, journaled in the top section 3. The forward end of this shaft extends through the front wall of the section and carries a crank-arm 60 (see Fig. 8). Each of the machine units 2 is provided with motor devices comprising a cross stud or shaft 61 (see Fig. 16), the outer end of which extends through the front wall of the section and carries a crank-arm 62. The base section 1 (see Figs. 30 and 31), is provided with motor devices comprising a cross stud or shaft 63 having a crank arm 64 on its outer end. The shafts 59, 61 and 62 are arranged in line (see Fig. 8) and the crank-arms 60 and 64 are all of equal length and are provided with pins 65 engaging the open-ended slots 67 in the edge of an upright connecting bar 68. The cam slot 52 (see Fig. 13) is so shaped that the slide plate 53 is shifted back and forth as the main motor shaft 8 is rotated to oscillate the shaft 59 and the motor shafts 61 and 63 through a quarter of a revolution. That is to say, when a voter is admitted to the machine and the main, upright motor shaft 8 is rotated through a half revolution, the horizontal motor shafts 61 and 63 of the sections are oscillated toward the left through a quarter revolution, and when the revolution of the main motor shaft is completed as the voter leaves the machine, these horizontal shafts are oscillated back through a quarter turn to normal position.

The connecting-bar 68 is preferably carried upon the rear face of a plate 69 (see Figs. 1 and 7) by pins 70 fixed to the plate and projecting through vertical slots in the connecting-bar. The plate 69 is revolubly held in place between the longitudinal strips 28 and 29. Plate 69, like the counter-concealing plates, is arranged in the same plane with the strips 29, but the plate 69 is made longer than plates 35 and 36 so that the strips 29 are cut away to receive it. The shoulders 72 of the strips 29 limit the movement of the plate 69 toward the left, and the forwardly projecting lug 27 on the back casing 5, prevents it from being withdrawn toward the right, except by the city clerk or other proper official. It will thus be seen that the motor mechanisms of the various devices, are all interlocked to the main motor shaft 8. But the city clerk may remove the back casing 5 and readily remove the plate 69 and connecting-bar 68 so as to disconnect the motor devices of the different sections or units. These motor devices may then be moved, as will presently appear, so as to release the counters from their actuators and permit the return of the former to zero position.

The main motor shaft 8 is also arranged to control the restoring and locking devices for the counter actuators. A slide plate 73 (see Figs. 10, 12 and 14), having spacing strips 74 on its under side near its ends, is arranged to slide within the top section upon the plate 53. Plate 73 is guided between the front and back walls of the top section and is provided with a cam-slot 75 within which extends a pin 76 fixed to a collar or disk 77 on the motor shaft. Plate 73 is arranged, as shown (see Fig. 10), between the collars or disks 77 and 50. The rear edge of the plate 73 is provided with a series of lugs 78 having notches 79 between them and coöperating with a series of crank-arms 80 carried on cross studs or rock-shafts 81, that are journaled in the front and rear walls of the top section 3. The rear ends of these shafts 81 extend through the side wall of the section and are provided with crank-arms 82 which are slotted at their ends to receive pins 83 on the upper ends of a series of longitudinally shifting bars 84. These bars are provided on one edge with a series of projecting lugs 85 that coöperate with the vertical rows of voting mechanisms to lock the latter normally against operation. When the motor shaft is shifted toward the right, plate 73 is shifted to move lug 78 away from the arms 80 on the rock-shafts 81. This serves to release the several locking and restoring bars 84. When the voter leaves the machine, the return shift of the plate 73 effected by the pin 76, serves to return the rock-shafts 81 and restoring and locking bars 84 to normal position. The upper ends of the bars 84 are guided in vertical direction by the engagement of the pins 83 thereon with a series of vertical slots 86 in a plate 87 (see Figs. 24, 25 and 29), that is carried on pins or studs 88 behind and parallel to the rear wall of the top section 3. The supporting pins 88 (see Fig. 25) are fixed to the rear wall of the top section and the plate 87 is held separated therefrom by the spacing thimbles 89.

Each of the machine units or sections carries a number of registers or counters and each counter comprises three dials 90 mounted upon hubs or sleeves 91. The dials are provided each with ten figures that are exposed through openings 92 (see Fig. 8), in the front wall of the section. The tens and hundreds hubs or sleeves 91 are provided with intermittent gears 93 which are arranged to be engaged respectively by single tooth actuators 94 on the units and tens sleeves or hubs. The tens and hundreds sleeves are also provided with independent locking wheels 95 arranged to engage cylindrical surfaces 96 on the units and tens sleeves. These locking surfaces are mutilated as at 97, opposite the teeth 94, so as to free the locking wheels 95 when the teeth 94 are in engagement with the gears 93. It will be seen that the dials of each counter are always locked together, either by the locking wheels and surfaces 95 and 96, or by the intermittent gears 93 and actuating teeth 94, so that movement can only be imparted to the counters by operating the units sleeve. These sleeves 91 are mounted upon the forward reduced ends of cross studs 98 that are journaled between the front and back walls of the frame section. There are four of these studs for each counter. The stud 98 upon which the unit sleeve is fixed, is provided with a squared part 99 upon which the units sleeve fits. The end of this stud projects through the front or face of the frame and is adapted to receive a suitable tool or crank by which the counters may be re-set at zero position after they have been released from their actuators.

The counter actuators are in the form of rotary or oscillating cylinders 100 that are mounted to revolve and slide upon the stud 98 adjacent the units stud. The inner end of the actuator is provided with a pinion 101 which is arranged to engage the teeth of the rack-bar 102, which slides longitudinally upon the bottom of the unit frame. The end of the rack meshes with the teeth on the pinion 103 that is fixed to the motor shaft 61 of the unit or section. The pinions 101 and 103 are of the same size so that as the voter is admitted to the machine, rack 102 is shifted to the right and all of the counter actuators of the machine are given a quarter turn toward the left. As the voter leaves the machine, the actuators are returned in the opposite direction to normal.

The actuator is provided with a single tooth gear 104 and a cylindrical locking surface 105, which coöperate with an intermittent gear 106 upon the unit sleeve of the counter. The tooth 104 is normally in line with the gear 106 instead of being normally out of line therewith, as in prior constructions, but the tooth is shifted out of line with its gear when the actuator is pushed in to voted position. With this arrangement, all of the counters or registers of the machine are advanced one step by the forward movement of the actuators when the voter is admitted to cast his ballot. But, as the voter leaves the machine, the counters, with the exception of those whose actuators have been shifted to voted position, are turned back one step. It is understood that the teeth of the actuator rack-bar 102 are wide enough to engage the teeth of the actuator pinions, both when the latter are in their outermost position and when they are pushed in to their voted position.

The cylindrical locking surface 105 is preferably of the same diameter as the pitch line of the single tooth gear 104, so that grooves 107 are left on opposite sides of the tooth to admit the corners of the teeth of the counter gear wheel 106. These grooves extend beyond the end of the tooth so that the teeth of the gear 106 will properly clear the actuator and will not be jammed, even though the tooth 104 of the actuator is not pushed in far enough and is left in partial engagement with the gear. The outer ends of the grooves 107 are separated by a half-tooth 108, which corresponds in shape to the tooth 104 up to the pitch line thereof. It is essential that this half-tooth be employed between the outer ends of the grooves and in the space in front of the actuator tooth 104, in order to properly shift the gear 106 in case the corners of its teeth should enter the space in front of the gear 104. Without this half-tooth the gear 106 would not be brought into proper relation with the surface 105 if its teeth should enter the space in front of the tooth 104. On the other hand, the wheel would become jammed and the corners of the teeth would ride on the locking surface. If desired, the locking gear and surface between the actuator and the unit sleeve, may be independent of the actuator tooth and intermittent gear as in the arrangement between the units and tens wheel. After the actuator has been pushed in and started on its backward movement, the tooth 104 behind the gear 106 prevents it from being pulled out again or restored until after its back movement to normal position is completed.

Upon the studs 98 which carry the actuator and unit sleeve and the hundreds sleeve of the next adjacent counter, is mounted a slide 110 which has a rearwardly projecting top flange 111 carrying a downwardly extending pin 112. The pin engages a spiral cam slot 113 in a cylindrical cam 114 that is fixed to the rear end of the actuator stud, and which forms the shifter for the counter actuator. The front end of the slide is provided with a yoke 109 that engages an annular groove in the rear end of the actuator. By this arrangement the actuator and slide are connected together for simultaneous back and forth shift, but the actuator may rotate independently of the slide.

By turning the actuator stud 98 and shifter cam 114, the slide and actuator are shifted to voted position. For this purpose the front ends of the actuator studs 98 are extended through the front wall of the frame and may, if desired, be provided with suitable cranks or keys. In the form shown however, the ends of the studs are provided with square portions adapted to be fitted by a suitable voter's key. The front slide plates 35 and 36 and the fixed plate 37 are provided opposite the ends of the actuator studs 98 with key-hole slots 115 having notches 116 that are 90° apart (see Fig. 1). The voter's key 117 (see Fig. 2), is provided with a circular head 118 adapted to fit the openings 115 of the plates and having lugs 119 corresponding to the notches 116. The head of the key is also provided with a socket 120 to engage the squared end of the actuator stud 98. When the key is placed within the key-hole slots 115 and upon one of the actuator studs 98 and turned slightly, the lugs 119 thereon are brought behind the edges of the key-hole slots so that the key cannot be removed until it has been turned through a complete quarter revolution, which is sufficient to move the actuator to its voted position. The key-hole slots also prevent the unauthorized manipulation of the actuators by one who is not provided with the proper key.

Preferably, the outer ends of the actuator studs 98 are provided with disks 121 which bear an "×" mark or cross that is normally hidden behind the front plates 35, 36 and 37. When any one of the actuator studs are given a quarter turn to the left, as required to move the actuator to voted position, the "×" mark is displayed through one of a series of openings 122 (see Fig. 1) in the front plates so as to show that the actuator has been properly moved to voted position.

It will be noted that the actuator is always interlocked with the counter by the engagement of either the locking surface 105 or the tooth 104 thereof with the counter gear wheel 106. The locking surface 105 is provided with a mutilated portion 123 diametrically opposite the tooth 104, but inasmuch as the actuator 105 can only be shifted through a quarter turn, the mutilated portion 123 cannot be brought into position to free the teeth of the gear 106, except by disconnecting the motor mechanism of any section from the common operating means. This can only be effected by the city clerk or other proper official who may remove the back casing 5, together with its forwardly projecting lug 27 so that the slide plates 69 and 68 may be disengaged from the crank-arms of the several motor shafts. The shafts may then be turned through the medium of the crank-arms as far as is necessary to bring the mutilated portion 123 of the actuators, into position to clear the teeth of the gear 106. The counters may then be set back to zero by turning the units studs 98.

The outer edge of the actuator rack-bar 102 of each section, engages guide studs 124 fixed to the bottom of the unit frame. Between the rear edge of the rack-bar and the rear wall of the unit frame, are arranged the wedge blocks or stop devices 125 of the limiting mechanism, which slide lengthwise of the section frames on the bottoms thereof. These wedge-blocks or stop devices are square at one end, but are provided with an inclined face 126 at the other end. The top of the inclined face 126 is cut off to form a face 127 which may abut against the square end of the adjacent wedge-block. It will be understood that each frame section has one more wedge-block or limiting stop device than it has voting mechanisms. The separators, one for each of the voting mechanisms, are preferably in the form of circular disks which are arranged in the spaces between the limiting stop devices or wedge-blocks and slide upon the bottom wall of the frame section. The separators 128 project above the wedge-blocks or limiting stop devices 124, as shown in Fig. 17, and are arranged to be engaged by a downwardly projecting rib 129 at the forward edge of the slide 111, so that whenever an actuator shifter or stud is moved to voted position, the separator corresponding thereto will be carried rearwardly, and by acting on the inclined face 126 of the adjacent separator block, the entire series of blocks will be elongated. The rib 129 extends the entire length of the slide 111 so that the series of blocks and separators may be shifted longitudinally in the frame section without changing the necessary relation between the parts.

Obviously, it is only necessary to limit the extent to which the series of blocks may be elongated to limit the number of actuator shifters or keys which can be operated. The separators are not positively connected to the actuator shifters as in prior constructions, but are free to slide longitudinally in contact with the longitudinally extending depending rib 129 of the slides 111 within the limit of movement of the wedge-blocks. The rear movement of the slides is not of sufficient extent to shift the separator block into position between the square portion 127 and the square end of the adjacent block, so that when the slide is returned to normal position, either when a voter retracts his vote or when he leaves the machine, the separator is not withdrawn with it as in prior constructions, but inasmuch as the rib 129 moves away from the separator 128, the latter no longer acts to hold the two adjacent wedge-blocks apart but will be forced back to normal position by the inclined face 126, when another actuator shifter or key is operated. But when the slide and actuator are shifted in to voted position, the corresponding separator is securely held in position to spread the adjacent blocks and cannot be forced outwardly since, while the cam or shifter 114 may be operated to shift the slide 111 in either direction, the inner end of the spiral cam slot 113 is arranged at right angles to the line of shift of the slide 111 and its pin 112 so that the slide and actuator are locked in voted position and can only be returned by turning the actuator stud or shaft 98 and the cam or shifter 114 thereon. If, by accident, the pin 112 of the slide is not shifted to the extreme inner end of the cam slot, the voter will still be prevented from casting more than the proper number of votes, since the outward movement of the separator would restore the slide and actuator to their unvoted position. It is obvious that the voter may, if he desires, turn back the actuator stud or shaft and shifter 114, to restore the slide and actuator and thus retract his vote. The one-way connection between the separators and counter-actuators by which they are shifted to voted position together but are returned to normal separately, permits the free shift of the limiting devices transversely to that of the actuators and obviates the necessity of any direct connection between the actuators and separators and the mechanism may be much more compactly arranged.

The end blocks or limiting stop devices of each series are not positively held against movement, but are connected together so that the entire series is free to shift in opposite directions. By this arrangement, the movement of any one block is only one-half what it would be if one of the end blocks was rigidly fixed against movement. For this purpose, the end blocks are provided with rearwardly projecting lugs 130 (see Fig. 16) which extend through slots 131 in the rear wall of the frame sections, and are provided with pins or studs 132 (see Fig. 21). The limiting bars or connections 133 are provided with one or more openings 134 at each end for engaging the studs 132 and connecting the end blocks of each series. Where the row of voting mechanisms in the frame section represents a single office, i. e. one to which a single person is to be elected, the end blocks of the limiting mechanism in that section are directly connected by the limiting bar 133. The lowermost limiting-bar or connection is shown so arranged in Fig. 21, and the studs 132 are so arranged in the holes 134 of the bar, that if one of the separators is pushed in to separate one pair of wedge-blocks, all of the other blocks will be brought solidly into engagement and the length of the series will equal the distance between the pins 132 on the end blocks. None of the other separators of the unit or section can then be pushed in and but one vote can be recorded for the office represented by that section.

The several frame sections or office rows of voting mechanisms can be used either for a single office group or for a multicandidate group. That is, several of the office rows or frame sections may be coupled together to permit a voter to cast all of his ballots for the candidates named in a single row or to vote a straight ticket, or otherwise cut up his ballot in any desired manner. In Fig. 21 the three top sections or rows of voting mechanisms are thrown into a single multicandidate group. Each limiting bar or section 133, extends across the machine and connects the end block of one section to the end block of the section above it at the other side of the machine. In the multicandidate group as in the single office group, one of the end blocks of the entire series is not held against movement as in prior devices, but the two end blocks of the entire series arranged in the multicandidate group, are connected together for simultaneous shift in opposite directions by a cross connection or bar 135, so that the series of wedge-blocks or limiting stop devices may shift as a whole in opposite directions. This arrangement, as stated, cuts down the necessary movement of any one block to one-half of that required if one of the end blocks of the connected series were fixed in position, and the arrangement has been found particularly valuable where there are a large number of persons to be elected to the same office, and where the multicandidate group of voting mechanisms must be made correspondingly large. The holes 134 in the limiting bars 133 and cross connection 135, permit the proper adjustment of these parts upon the pins 132 so that only the proper number of votes may be cast.

Each of the actuator studs or rock shafts 98, extend through the rear wall of the frame section and carries a tumbler head formed in two plates or cross arms 136, connected at their ends by pins 137 and 138 (see Figs. 16 and 22). The plates or arms 136 of the tumbler head, are separated as shown, while the pins are off-set on opposite sides of the end of the rock shaft or stud, so as to form in effect crank arms and crank pins. The vertical bars 84 at the rear of the upright frames (see Fig. 22) are provided on one edge with lugs 85 which extend between the plates 136 and are normally positioned just above the pins 137 so as to prevent the shift of the rock shafts and actuators to voted position. The vertical bars 84 and their operating rock shafts 81 are normally held against movement by the engagement of the lugs 78 on the restoring plate 73 with the lugs 80 on the rock shafts (see Figs. 12 and 14). When the voter approaches the machine the restoring plate 73 is shifted, as previously described by the pin 76 on the motor shaft 8, to move the lugs 78 away from the arms 80 so as to permit the movement of the bars 84 and the actuator rock shafts. The return movement of the plate 73, when the voter leaves the machine, restores the rock shafts 81 and bars 84 to normal position and the latter restored with the actuator rock shafts and actuators which may have been moved.

As above stated, the pins 51 and 76 are so located on the motor shaft 8 that the actuator operating bar or plate 51 is shifted in advance of the restoring plate 73, as the voter leaves the machine so that the counter actuators that have been placed in voted position will be rotated before they are restored into engagement with their counters. Moreover, the actuator-bar is moved in advance of the restoring and locking bar as the voter enters the machine. If the bars 73 were moved first to unlock the actuator shifters the voter might shift one or more of them before they were rotated by the movement of the bar 53, so that the counters connected thereto would not be advanced one step with the remaining counters of the machine. The voter could then withdraw the shifted actuators, cast his ballot, and, as he left the machine the counters of these actuators would be turned back one step. By arranging the mechanism so that the actuator operating bar 53 is shifted in advance of the restoring locking bar 71, both when he enters and when he leaves the machine, such fraudulent manipulation is prevented.

It will be noted that the lugs 85 are spaced some distance apart so that, when one of the actuator rock-shafts 98 is moved through a quarter turn to voted position, it will not lift the bar 84 sufficiently to bring the lugs 85 into engagement with the pins 137 above the lugs. But if one of the rock shafts is shifted through a quarter turn, as is possible when the restoring plate 73 is moved to its extreme right hand position, lugs 85 of the bar 84 connected to the shaft, will operate upon the pins 137 above them to rotate the actuator rock shafts 98 and thus move all of the actuators in a single vertical row or ticket to voted position. To effect such a shift of the rock shafts 81, they are extended through the front wall of the top section of the machine and provided with straight ticket keys or arms 140 (see Figs. 1 and 11). The universal members 84 thus serve both as restoring bars and straight ticket bars. It should be further noted that by manipulating the straight ticket keys all of the voting mechanisms and a single column or ticket may be moved to voting position or restored to change or correct the vote.

Preferably, the two lower sections of the machine are arranged for voting on questions and while their individual voting mechanisms and actuators are otherwise the same in construction and arrangement, the limiting blocks of these sections are not connected and the counter actuators should not of course be shifted by the straight ticket mechanisms. It will be noted that the restoring or straight ticket bars 84 are not provided with lugs below the actuator rock-shafts 98 of the lower section (see Fig. 22). The lugs 85' for restoring the actuators of the lower section, are mounted on slides 141 which are connected to the bars by pins 142 engaging slots 143 therein. In the lowermost position of the bars 84, the pins 142 are in the upper ends of the slots 143, so that the downward or restoring shift of the bars will operate to turn back the actuators in the lower unit frame, but the upward shift of any one of the bars affected by its straight ticket key, will not operate the actuators in the second unit frame by reason of the loose one-way connection between the lowermost lugs 85' and the bars.

To relieve the main limiting mechanism of the machine from strain, a supplemental interlocking mechanism is provided by which the shift of any one of the straight ticket keys to voted position will directly lock out the other straight ticket keys. A plate 144 is carried in rear of the top section and in rear of the plate 87 upon the pins 88 (see Figs. 21, 25 and 26). This plate is preferably mounted to slide on the pins 88 which extend through slots 145 therein, and the latter is held apart from the plate 87 by the separator strips 146 which are secured by rivets to the outer plate 144. Collars 147 fixed on the ends of the pins 88, hold the outer plate in place. The pins 83 on the rock-arms 82 of the straight ticket shafts, extend through the vertical slots 86 (see Fig. 29) in the inner plate 87 into the space between the latter and the plate 144, and in this space are arranged two sets of limiting wedge-blocks 148 and 149, which are guided between the separator strips 146. In Figs. 27 and 28 the outer plate 144 is removed to show the wedge-blocks, the inner set 148 being alone shown in Fig. 28. The lower corners of each block are cut away to form spaces through which the pins 83 extend and to form the inclined cam-faces 150 and 151. The cam-faces 151 are longer and deeper than the cam-faces 150, as shown, and with the inner set of blocks the long cam-faces 151 are at the right hand end of the blocks (see Fig. 28) but, with the outer set of blocks, the long cam-faces 151 are at the left hand end of the blocks (see Fig. 27). With the separator blocks in the position shown in Figs. 27 and 28, it is obvious, that if any one of the straight ticket keys is operated, the pin 83 of that key will engage the long cam-face 151 of the inner block 148 to the left of it and shift the inner set of blocks to lock all of the straight ticket keys at the left. The pin 153 of the shifted key will also engage the long cam-face 151 of the outer block 149 at its right and will shift the outer set of blocks to lock all of the straight ticket keys on the right of the shifted key. In this way the inner set of blocks operate to lock the straight ticket keys on one side of the selected key and the outer set lock the keys on the other side. These separator blocks are not retracted to normal by the return movement of any selected key, either when retracted by the elector to change his vote or by the operation of the machine but they will be restored to normal on the subsequent operation of any of the voting mechanisms by the engagement of the pins 83 with the short cam-faces 150 of both sets of blocks. That is to say, any one of the pins 83 will restore the blocks 148 of the inner set that are on the left of it, and will restore blocks 149 that are on its right.

When the two lower sections are used for balloting on questions, the tumbler heads on the ends of the actuator rock-shafts 98 are cross connected by bars 152. The pins 137 and 138 of the tumbler heads project beyond the rear cross-arm 136 (see Fig. 16), and the bars 152 are swiveled at their upper ends on the ends of the pins 138 of the second section while the pins 137 of the lower section extend through slots 153 in the lower ends of the bars. In normal position pins 137 are in the lower ends of the slots 153. It is obvious that with the cross connection between the two shafts, one of which represents a "yes" vote and the other a "no" vote, either shaft may be moved to voted position, but that when so moved pin 137 is in the upper end of the slot 153 and the bar 152 will then prevent the movement of the other actuator shaft of the connected pair, unless the first vote cast is retracted. Any of the unit frames or sections may thus be used without change in its construction for voting on amendments.

The lower ends of the restoring or straight ticket bars 84 (see Fig. 22) are guided between rollers 154, which are carried on pins 155 between a longitudinally extending strip or bar 156 and a series of cross strips 157. The bar 156, short strips 157 and rollers 154 thus form pockets to receive the lower ends of the bars 84. The bar 156 is carried upon the rear face of the base section 1 by pins 158 which project through vertical slots 159 in the ends of the bar.

The bar 156 is provided with pins 160, to the reduced ends of which (see Figs. 22 and 26) are connected the upright bars 161, and inner bar 162 is connected to each of the bars 161 by pins 163 but is held apart therefrom by spacing thimbles 164. The upper ends of the bars 161 and 162 extend between the top section and the plate 87 secured thereto and the upper pins 163 engage guide slots 165 in the plate 87 (see Fig. 29). A series of dogs 166, one for each one of the voting mechanisms, are mounted between the uprights 161 and 162 upon pins 167 that extend through slots 169 in the upper ends of the dogs. These dogs are arranged in line with the portions of the pins 138 of the tumbler heads that lie between the plates 136 and are provided with toe-pieces 168 for engaging the pins 138 and thereby lock the voting mechanisms against operation. Each dog is long enough to engage the upper end of the one below it, but by reason of its slotted connection with the uprights 161 and 162, it may be lifted over the upper end of the dog below it and placed either in its forward operative position or in its retracted inoperative position. In either case it will be held in the position to which it is set by the upper end of the dog below it. The lower dog of each series is held either in its operative or inoperative position by the thimble 164. Each dog is provided with a lug 170 near its upper end having a pin 171. In the forward position of the dog, pin 171 engages the edge of the uprights 161 and 162 and locks the dog against accidental displacement.

In class voting, some of the voting mechanisms of the machine represent offices for which the specially qualified electors are not entitled to vote. In preparing the machine for the election, the dogs corresponding to these mechanisms will be set in operative position while the remainder will be left out of operative position. Then by raising the longitudinal bar 156, together with the uprights 161 and 162, the dogs in operative position will engage the pins 138 of the corresponding voting mechanisms and lock the actuator rock-shafts thereof against movement. In this manner, the machine may be set by the judge of election when a specially qualified voter is to cast a vote. In the lowermost position of the uprights, none of the voting mechanisms are of course, locked by the dogs.

The vertical shift of the class voting mechanism is effected by a longitudinal bar 172 (see Fig. 22) arranged below and in contact with the lower edge of the bar 156. Bar 172 is carried on pins 173 fixed to the lower base section 1 and extending through inclined slots 174 in the bar. A rock shaft 175 journaled in one end of the base section, is provided with a square rear end portion upon which a special key or crank may be fitted through an opening in the rear closing portion 5 of the machine. This shaft is provided with an arm 177 in line with the bar 172 and by which the latter is shifted longitudinally when the crank 175 is turned. This longitudinal shift by reason of the inclined slots 174, will lift the bars 172 and 156 and the locking out dogs connected with the latter. The inclined slots 174 are provided with horizontal portions 178 on their lower ends so that when shifted the locking out devices are held against accidental displacement. The motor shaft 63 in the base section 1 extends through the rear wall of the section and is provided with an arm 179 which normally holds the class voting mechanism against movement and which also acts to automatically restore the same as the special qualified voter leaves the machine. The class voting mechanism thus comprises separate locking out devices for the individual counters or counter-actuators and any counter or actuating means or any group of counters may be locked out as required.

The pins 83 of the arms 82 of the straight ticket shafts 81, project within longitudinal slots 180 in the shifting plate or bar 144 (see Figs. 21 and 24). From the upper edge of the horizontal slots 180 extend the vertical cut-away spaces or slots 181 which are so placed that in the normal position of the sliding bar 144, any of the pins 83 may shift vertically as the voting mechanisms are operated. When the machine is to be used at a primary election means are provided for shifting the bar 144 one, two, three or four steps. The cut-away spaces 181 above the first pin 83 that is connected to the free ballot mechanisms, is so wide that the pin will not be locked against vertical movement unless the bar has been moved four steps. Two narrow vertical cut-away spaces 181 extend from the horizontal slots 180 within which the second and third pins extend, and these cut-away spaces or vertical slots are so positioned that the second one of each pair will be brought in line with its corresponding pin 53 after the primary voting bar 144 has been moved two and three steps respectively, while the slot 181 of the last pin 83 is of such width that the movement of the plate 144 through a single step will not lock it but any further movement of the bar will hold this last pin against operation. Thus, the movement of the primary voting bar 144 through a single step will lock the second and third pins corresponding to the Democratic and Republican tickets, but will leave the last pin, which corresponds to the Prohibition ticket free; two steps will lock out the Republican and Prohibition tickets and leave the Democratic voting mechanism free, while three steps will permit the operation of the Republican voting mechanisms but will lock out those of the Democratic and Prohibition. The free ballot key will always be free for operation when any of the other ticket keys can be operated. When the voting bar is shifted to the end of its movement, all of the voting mechanisms are locked. It is obvious that this construction is not limited to three rows or party groups of voting mechanisms, but can be readily modified so that by shift of the primary voting-bar the proper number of steps, all of the party groups but one may be locked out.

When the machine is to be used at a primary election, an operating bar or link 182 is connected at one end to the primary voting bar 144. The other end of the bar 182 is connected to a rock-arm 183 upon the rock-shaft 175. A suitable pointer or indicator is provided to show how far the shaft 175 should be shifted to free the desired party group of vote registers and lock out the remainder.

Where a candidate of one party for an office to which several persons are to be elected, is indorsed by another party, there will be two counters in separate party columns representing this candidate, and inasmuch as these counters are arranged in a multicandidate group, means must be provided for preventing an elector from voting twice for the indorsed candidate. When this occurs the two counting mechanisms in a single section and in different party columns which represent the indorsed candidate, will be connected by a cross piece 184 that is secured to the outer projecting ends of the pins 138 of the tubular heads. The limiting blocks in this section will not be connected and the other counting devices, unless there is more than one indorsed candidate, in this section will be idle; that is to say, they will not represent any candidates. Cross piece 184 is provided with an extension 185 engaging the pin 138 of a counting mechanism in an adjacent section that is arranged in the multicandidate group. Inasmuch as the three pins 138 to which the connecting piece is secured are out of line, all three counters will move in unison when any one of them is operated, but only a single separator will be inserted between the wedge blocks connected in multicandidate group.

The row of voting or registering mechanisms at the left of the machine are used for casting ballots for irregular candidates whose names do not appear upon the face of the machine. The parts of these mechanisms within and carried by the units frames are entirely similar in construction to the other individual voting devices, except that it is not necessary to provide them with counters and counter mechanisms, although this may be done if desired. If counters are employed they will be hidden by the fixed plate 37 (see Fig. 1) and cannot be disclosed except by the city clerk. The free ballot mechanisms are provided with means by which the ballot may be so marked as to indicate the office for which the elector had a right to cast a free ballot. That is to say, the free ballot devices are connected as already described, to the limiting mechanism of the machine so that only those keys or shifters in the free ballot column can be operated corresponding to offices for which the elector has not cast votes for regular candidates, and these shifters so operable control printing devices which mark the free ballot with identifying letters, numerals or characters corresponding to the offices for which the elector has a right to cast a free ballot and for which regular candidates have not been voted.

The printers are preferably in the form of sliding plungers 186 (see Figs. 31 to 34 inclusive) having identifying characters or marks on their outer ends corresponding to the offices that they represent. These plungers are arranged within a suitable casing 187 secured to the under side of the bottom section of the machine by bolts 188. A box-shaped slide 189 having top, side and front walls but open at the rear and at the bottom, is mounted in the upper portion of the casing 187, and a block or support 190 fixed to or formed in piece with the upper wall of the slide 189, is provided with horizontal openings to receive the printing plungers 186. A U-shaped cross piece 191 is secured at its ends to the side wall of the casing 187 and the depending lug or block 190 of the slide 189 rests upon this cross piece while the sides of the slide fit between the legs of the U-shaped cross piece 191 and the side walls of the casing 187 (see Fig. 31). Spacing thimbles 192 between the ends of the U-shaped cross piece 191 and the sides of the casing 187, hold these parts in proper position to form guides for the slide 189. A pair of studs 193 fixed to the upper part of the slide 189, extend through transverse slots 194 in the bottom of the base section 1, and the ends of these studs engage cam-slots 195 in a shifting plate 196. This plate is connected by links 197 to a crank arm 198 on the oscillating motor shaft 63 of the base section. The edges of the plate abut against the front and rear walls of the base section but are provided with cut-away spaces 199 through which the bolts 188 extend. Cross pieces 200 extend between the bolts 188 and over the plate 196 to hold the plate in engagement against the bottom of the base section.

Plungers 186 are provided at their inner ends with heads 201 connected thereto by flattened stems 202. Each stem projects between a pair of plates 203 that have slots 204 in their side walls to receive the heads 201. The plates of each pair are fixed to a flat piece 205 and these pieces 205 extend through a series of vertical slots 206 in the rear wall of the casing 187. Straps 207 on the rear projecting ends of the sliding pieces 205 are connected by links or rods 208 (see Fig. 21), to the pins 138 of the tumbler heads belonging to the free ballot voting devices. The vertically shifting slide formed by the plates 203 and projecting pieces 205, are normally in upraised position shown in Fig. 32. In this position the printing plungers 186 are free to be moved rearwardly to a limited extent. The plates 203 are provided with shoulders or lugs 209 at the upper rear portions of the slots 204, which when the slide is in its lowermost or voted position, are positioned behind the heads 201 of the printing plungers (see Fig. 33) so that the latter cannot be forced rearwardly.

Below the casing 187 is arranged a ballot box 210 that is swiveled at one side to the casing 187 by pivots 211 and at the other side is connected to a casing by a hasp 212 and a pad-lock 213. The bottom of the casing 187 is provided with an opening 214 near its front portion through which ballots may pass into the box 210. The front wall of the slide 189 is provided with a vertical slot 215 through which ballots may be inserted and the rear portion of the front wall is provided with a cross horizontal slot 216 (see Figs. 33 and 34), through which the plungers 186 may extend to impress the free ballot. A cross piece 217 extends between the side walls of the casing 187 just in rear of the front wall of this casing so as to leave a space 218.

In the normal position shown, the actuating plate 196 is at the extreme left of its shift, the slide 189 is at the outer end of its movement and the stop slides 203 are in raised position. In this position the slot 215 of the slide 189 is in line with the open spaces or slots 218 and 214 (see Fig. 32). When the voter is admitted to the machine the quarter turn of the oscillating motor shaft 63 will shift the plate 196 and move the slide 189. Cam-slots 195 are so shaped that as the plate 196 moves to the right the slide carrying the plungers will be moved first rearwardly and then forwardly. It will not however, be returned to its extreme forward position and the slot 215 therein will not be brought back into line with the open spaces 218 and 214, but its lower end will be closed by the cross piece 217.

Should the elector desire to cast a free ballot having the names of the irregular candidates written or printed thereon, he will deposit the same within the slot 215 and operate the proper voting devices in the free ballot column. The corresponding stop slides 203 will be lowered to block the movement of the corresponding printing plungers 186. When the voter leaves the machine the return shift of the motor shaft 63 and rock-arm 198 thereon will move the plate 196 toward the right and thereby shift the slide 189, together with the ballot in the slot 215 first rearwardly to force the ballot against any of the printing plungers that are held against movement, and then forwardly back to the normal position shown in Fig. 32. The ballot is then free to drop through the spaces 218 and 214 into the ballot-box 210. The rearward position of the slide is shown in Fig. 33 and in this position it is apparent that the free ballot in the slot 215 will be marked with the identifying numeral of the plungers that are blocked against movement. The other plungers cannot of course, make any impression on the ballot. It will also be noted that inasmuch as the printing is not effected until the voter leaves the machine, he may retract any of the stop slides 203 that he may have shifted to change or correct his vote.

The movement of the slide 189 as the voter is admitted to the machine, cannot be utilized by a voter to mark a special ballot, since the shifters or keys controlling the stop slides 203 are locked until after the center position of the slots 195 of the plate 196 have moved past the studs 193 so that the printing or marking plungers 186 cannot be held in place to make an impression as the slide 189 is moved rearwardly on the admission of the voter to the machine, but they can only be so held for this purpose as the motor mechanism returns the parts to normal position when the voter leaves the machine.

The fixed plate 37 bears the names of the offices to be filled at the election while the plates 35 and 36 bear the names of the candidates nominated by the different parties.

At the polls, the face of the machine is normally exposed. When the shaft 41 is turned by the judge of election to throw the bolt 46 into locked position, the slide frame and its plate 35 and the plates 36 may be shifted to show the inspectors that the counters are all at zero. The judge must however, shift the plates 35 and 36 into position to conceal the counters and lock the sliding frame in place by turning the shaft 41 before the locking bolt can be released to permit operation of the machine. Normally the locking and restoring bars 84 are held in their lowermost positions and the counter actuators are in their retracted positions. An elector on approaching the machine, turns the booth-carrying arm 8' and main motor shaft 8 through a half revolution. The pin or tappet 50 of the motor shaft first shifts the plate or bar 53 to rotate the supplemental motor shafts 59, 61 and 63 of the several machine sections through a quarter revolution and subsequently, the pin or tappet 73 shifts plate 74 to release the restoring bars 84 and the actuator shifters. The movement of the supplemental motor shaft 61 of the unit sections will shift the rack-bars 102 and rotate the counter actuators 100 so that all of the counters or registers will be advanced one step.

The voter concealed in the booth, then by use of the key 117, may turn any of the actuator studs or shafts 98 to shift the actuators rearwardly out of operative relation with their counters at the same time forcing the separators between the blocks of the limiting mechanism until the limit of each connected series of blocks is reached. The voter will then find it impossible to operate further of the actuator shifters or keys, until he first retracts some of those previously operated. If the voter desires, he may use one of the straight ticket keys thereby voting the entire column of individual actuator shifters beneath it. He then may retract any of the individual shifters that he wishes and vote corresponding shifters in the same office rows or multicandidate groups.

The shift of the motor shaft 63 of the base section when the voter enters the machine, will position the slot 215 of the slide 189 over the cross piece 217 so that if the voter desires, he may place a free ballot having the names of any irregular candidates written or printed thereon within the slot 215. By operating the shifters or keys of the free ballot mechanism, he may set the slides 203 to lock the printing or marking plungers 186 corresponding to those offices for which the elector has not voted any of the regular candidates named on the face of the machine. Having finally completed this ballot, the voter completes the rotation of the booth and motor shaft 8, thus first returning the actuator bars 102 of the several sections and subsequently restoring the actuators and actuator shifters to normal position. The return movement of the actuators which have been shifted to voted position, will not affect their counters and these will remain permanently advanced one step. The remaining counters, which were set forward one step as the voter enters the machine, will however be turned back to the position they previously occupied. The return movement of the motor shaft 63 of the base section 1, will first move the slide 189 rearwardly to properly mark the free ballot and will then shift it to its extreme forward position so that the ballot will drop into the box 210.

When the polls are closed the judge of election removes the pad-lock 38, turns the shaft 41 to release the sliding frame and permit the movement of the plates 35 and 36 to disclose the vote. This movement of the shaft 41 will shift the bolt 46 and lock the machine against further movement. The bolt cannot be again released, inasmuch as the first operation of the machine shifts the trip 43 back out of line with the lug 48 on the bolt.

When it is desired to prepare the machine for the next election, the city clerk or other proper official unlocks the machine by moving the pad-lock 26 and the back casing 5. The plate 69 may then be shifted and the several motor shafts released from the common connecting bar 68. The motor shafts 61 of each section may then be turned through a half revolution to bring the cutaway spaces 123 of the counter actuators opposite the teeth of the intermittent gear 106 so that the individual counters may be returned to zero. By removing the top plate 4 and the upper plate 14 of the casing 13, the wheels of the total counter in the casing 13 may be set back to zero position. The machine is then made up with the proper number of units or sections and the office name-plate and party group plates made in accordance with the requirements of the election are put in place. The limiting devices or blocks are properly connected by the bars 153 as is necessary to throw certain of the sections into multicandidate groups and leave the remaining sections representing single offices. Before the back plate is finally locked in place the trip 43 for the locking bolt 46 will be pushed to its forward position by inserting a pencil or suitable device through the hole 57 (see Fig. 12) in the back of the top section 3, so that the election judge may manipulate the locking device and expose the counters before election commences, without permanently locking the machine against operation.

It is obvious that numerous changes may be made in the details of structure set forth without departure from the essentials of the invention.

In the following claims, the term "shifters" or "keys", when unqualified, is intended to include any register controlling devices that are shifted or otherwise moved by the voter in casting his ballot, and the term "counters" or "registers" is intended to include any suitable vote registering means.

Having described my invention, what I claim as new and desire to secure by Letters Patent, is:

1. In voting machines, the combination with the normally inaccessible registers and register actuating mechanisms, of a locking device for holding said registers against operation and means controlled by the operation of the register actuating mechanism arranged to compel the permanent setting of said lock when access is afforded to said registers after they have been operated, but permitting access thereto before said registers have been operated without permanently locking the same.

2. In voting machines, the combination with the normally inaccessible vote registers, of a lock therefor, a part coöperating with said lock and arranged to be shifted by the operation of said registers into position to compel the permanent setting of said lock when access is afforded to said registers after they have been operated.

3. In voting machines, the combination with the counters, actuating mechanism and counter concealing devices, of a lock for holding said counters against operation, a shifting member arranged to be moved by the operation of the said counter actuating mechanism, and means associated with said parts arranged to compel the permanent setting of said lock when said counters are exposed to disclose the vote but permitting the exposure of the counters without permanently locking the same before they have been operated.

4. In voting machines, the combination with the series of vote registers, of means normally rendering said registers inaccessible, a catch for holding the same in place, register actuating mechanism, a lock therefor, and a part associated with said catch and lock and arranged to be shifted by said operating mechanism into position to compel the permanent setting of said lock when said counters are exposed to disclose the vote.

5. In voting machines, the combination with the normally inaccessible vote registers, of a lock therefor, means compelling the setting of said lock when access is afforded to said counters, means for releasing said lock, register actuating mechanism and means controlled by the operation of said mechanism for rendering said releasing means inoperative, whereby said lock is permanently set in operative position when said counters are exposed to disclose the vote.

6. In voting machines, the combination with the normally concealed counters, of means arranged to compel the locking of said counters against operation when exposed, a releasing trip for said locking means and counter actuating mechanism arranged to shift said releasing trip to an inoperative position.

7. In voting machines, the combination with a series of counters, counter concealing means, and counter actuating mechanism, of a catch for holding said counter concealing means in place, a lock for said counter actuating mechanism, said catch and lock being shiftable together in opposite directions to lock one of said parts against movement and release the other of said parts and means arranged to compel the permanent setting of said lock when said counter concealing means are released after said counters have been operated.

8. In voting machines, the combination with the counters, counter concealing means and counter actuating mechanism, of a catch for holding said counter concealing means in place, a lock for said counter actuating mechanism, said catch and lock being shiftable together to lock one of said parts against movement and release the other of said parts and means coöperating with said catch and lock and operated by said counter actuating mechanism to compel the setting of said lock in a non-releasable position when said counter concealing means are released after said counters have been operated.

9. In voting machines, the combination with the counters, counter actuating mechanism and counter concealing means, of a catch for holding said counter concealing means in place, a lock for holding said counters against operation, a lock actuator operated by said catch arranged to shift said lock to set and released positions and means controlled by said counter actuating mechanism for rendering said lock actuator only operable to set said lock, whereby said counters are permanently locked against operation when exposed after they have been operated.

10. In voting machines, the combination with the counters, counter actuating mechanism and counter concealing means, of a catch for holding said counter concealing means in place, a lock for holding said counters against operation, a lock actuator shifted in opposite directions by said catch, abutments with which said actuator engages as it is shifted to set and release said lock and means operated by the counter actuating mechanism for shifting said actuator out of line with one of said abutments, whereby the actuator is only operable to set said lock after said counters have been actuated.

11. In voting machines, the combination with the counters, the counter actuating mechanism and the counter concealing plates, of a rotary catch for holding said plates in place, a reciprocating locking bolt for said counter actuating mechanism, an actuating arm on said rotatable catch shiftable in opposite directions therewith but free to slide thereon, said locking bolt having abutments with which said arm engages to set and release the bolt and means operated by said counter actuating mechanism for sliding said arm out of line with one of said abutments, whereby said arm is only operable to set said lock.

12. In voting machines, the combination with a series of counters, individual actuators therefor and balloting shifters for moving said actuators into and out of operative relation with said counters, of a motor shaft, operating connections between said shaft and said actuators, a bolt for locking said shaft against movement, an arm for engaging and setting said bolt, the latter having an abutment with which said arm engages to release the bolt, means operated by said shaft for shifting said arm out of line with said abutment, means for concealing said counters and a catch device movable with said arm for holding said counter concealing means in place.

13. In voting machines, the combination with two or more rows of voting devices representing different party tickets, counters for said voting devices and counter actuating mechanism, of a series of party group plates normally concealing said counters and a sliding frame for holding said plates in place, said frame having a notch in its edge, a rotary catch coöperating with said notch to lock said frame and a lock for said counter actuating mechanism arranged to be shifted by said catch.

14. In voting machines, the combination with two or more rows of voting devices representing different party tickets, counters for said voting devices and counter actuating mechanism, of a series of party group plates normally concealing said counters and a sliding frame for holding said plates in place, said frame having a notch in its edge, a rotary catch coöperating with said notch to lock said frame, a lock for holding the counters against operation arranged to be operated by said catch and means arranged to prevent the complete disengagement of said sliding frame from said catch.

15. In voting machines, the combination with two or more rows of voting devices representing different party tickets, counters for said voting devices and counter actuating mechanism, of a series of party group plates normally concealing said counters and a sliding frame for holding said plates in place, said frame having a notch in its edge, a rotary catch coöperating with said notch to lock said frame, a lock for holding the counters against operation, an arm on said catch for setting said lock, said lock having an abutment with which said arm engages to release the lock and means operated by the counter actuating mechanism for shifting said arm out of operative relation with said abutment.

16. In voting machines, the combination with the normally inaccessible vote registers, of a lock for holding said registers against operation, a part coöperating with said lock and arranged to be shifted by the operation of said registers into position to compel the permanent setting of said lock when access is afforded to the counters after they have been operated, a city clerk's lock and means under control of the city clerk's lock for normally preventing the resetting of said part.

17. In voting machines, the combination with the counters, actuator mechanism therefor and counter concealing devices, of a lock for holding said counters against operation, a shifting member arranged to be moved by the operation of said counter actuating mechanism, means associated with said parts arranged to compel the permanent setting of said lock when said counters are exposed to disclose the vote, a city clerk's lock and means under control of the city clerk's lock for preventing the release of said lock after it has been permanently set.

18. In voting machines, the combination with the counters, actuating mechanism therefor and counter concealing means, of a lock for holding said counters against operation, means compelling the setting of said lock when said counters are exposed, a releasing trip for said lock, means operated by said counter actuating mechanism for rendering said trip inoperative, a city clerk's lock and means under control of said city clerk's lock arranged to normally prevent the resetting of said trip.

19. In voting machines, the combination with the counters, counter actuating means and counter concealing means, of a catch for holding said counter concealing means in place, a lock for holding said counters against operation, an actuator for setting and releasing said lock operated by said catch, means operated by the counter actuating mechanism for rendering said actuator operable only to set said lock, a city clerk's lock and means under control of the city clerk's lock for normally preventing the resetting of said actuator.

20. In voting machines, the combination with the series of counters and with means for rendering said counters inaccessible, of a catch for holding said means in place and devices arranged to compel the setting of said means in operative position and the setting of said catch before said counters can be operated.

21. In voting machines, the combination with the series of counters and counter concealing means, of a catch for holding said counter concealing means in place, means arranged to prevent the shift of said catch when said counters are exposed and a lock preventing the operation of said counters arranged to be released by the shift of said catch.

22. In voting machines, the combination with the counters, counter actuating mechanism and counter concealing means, of a shiftable catch for holding said counter concealing means in place, means for preventing the shift of said catch when the counters are exposed and a lock for holding said counters against operation arranged to be released by the shift of said catch to its locked position.

23. In voting machines, the combination with two or more rows of voting devices representing different party tickets for said devices and counter actuating mechanism, of a series of sliding office group plates for concealing said counters, a sliding frame for holding said plates in place having a notch in its edge, a rotary catch having a cutaway portion coöperating with said notch to hold said frame and plates in position, means for preventing the complete disengagement of said frame from said catch and a lock for preventing the operation of said voting devices controlled by the movement of said catch.

24. In voting machines, the combination with two or more rows of voting devices representing different party tickets for said devices and counter actuating mechanism, of a series of sliding office group plates for concealing said counters, a sliding frame for holding said plates in place having a notch in its edge, a rotary catch having a cutaway portion coöperating with said notch to hold said frame and plates in position, a fixed stop device for preventing the complete disengagement of said frame from said catch, and a lock for preventing the operation of said catch devices controlled by the movement of said catch.

25. In voting machines, the combination with the end frame sections, of a series of unit frames arranged between said end sections, an office row of voting devices carried by each of said unit frames, counters for said voting devices arranged in party groups or rows, guides fixed to said end sections, a series of office group plates arranged to slide in said guides and normally conceal said counters, a frame sliding in said guides for holding said plates in place and a locking catch for said frame.

26. In voting machines, the combination with the end frame sections, of a series of unit frames arranged between said end sections, an office row of voting devices carried by each of said unit frames, counters for said voting devices arranged in party groups or rows, guides fixed to said end sections, a series of office group plates arranged to slide in said guides and normally conceal said counters, a frame sliding in said guides and engaging said plates, a catch for holding said frame and plates in position to conceal said counters, means for preventing the complete disengagement of said frame from said catch and a lock for preventing the operation of said voting devices controlled by the movement of said catch.

27. In voting machines, the combination with the series of vote registers and with a series of balloting shifters for controlling the operation of said registers, said shifters being movable into and out of voted position, of means for causing the simultaneous advance of all of said registers and the retraction of the registers whose corresponding shifters are in normal unvoted position.

28. In voting machines, the combination with the series of vote registers and with the corresponding series of balloting shifters, movable into and out of voted position to correct or change a vote, of interlocking mechanism for preventing the operation of more than a predetermined number of balloting shifters and means for causing the simultaneous advance of all of said registers and the retraction of the registers whose corresponding shifters are in normal unvoted position.

29. In voting machines, the combination with the series of vote registers, of actuating mechanism for advancing and retracting said registers during a single operation of the machine and balloting shifters associated with said register actuating mechanism for preventing the retraction of the registers corresponding thereto.

30. In voting machines, the combination with the series of vote registers, of actuating means for advancing and retracting said registers during a single operation of the machine, a series of balloting shifters, associated with said register actuating mechanism for preventing the retraction of the registers corresponding thereto and interlocking mechanism for preventing the operation of more than a predetermined number of said balloting shifters.

31. In voting machines, the combination with the series of vote registers, a series of balloting shifters controlling the operation of said registers and means for locking said balloting shifters, of motor devices for unlocking said shifters and for advancing all of said registers to prepare the machine for the voter and for retracting the registers whose corresponding shifters are in normal unvoted position.

32. In voting machines, the combination with the series of vote registers, of a series of balloting shifters for controlling the operation of said registers, operating mechanism for unlocking said shifters and advancing said registers as the voter approaches the machine and for restoring and locking said parts as the voter leaves the machine, said shifters being freely movable into and out of voted position when unlocked, means operated by said balloting shifters for preventing the restoration of the corresponding registers and interlocking mechanism for preventing the operation of more than a predetermined number of said balloting shifters.

33. In voting machines, the combination with the series of vote registers, of individual actuators for advancing and retracting said registers, said actuators being shiftable to and from voted position and out of and into operative relation with said registers, and said actuators, in normal unvoted position, being in operative relation with said registers.

34. In voting machines, the combination with the series of vote registers, movable to advance and retract said registers and normally in operative relation therewith, and a series of balloting shifters coöperating with said actuators to permanently maintain the corresponding registers in advanced position.

35. In voting machines, the combination with the series of vote registers and with the individual actuators normally in operative relation therewith, of means for causing said actuators to advance said registers as the voter approaches the machine and retract the same as the voter leaves the machine, and means under the voter's control coöperating with said actuators to prevent the restoring movement of a certain predetermined number of said registers.

36. In voting machines, the combination with the series of vote registers and with the individual actuators normally in operative relation therewith, of means for causing said actuators to advance said registers as the voter approaches the machine and retract the same as the voter leaves the machine, a series of balloting shifters under the voter's control for throwing said actuators out of operative relation with said registers and interlocking mechanism for preventing the operation of more than a predetermined number of balloting shifters.

37. In voting machines, the combination with the series of vote registers, of actuating mechanism for said registers normally in operative relation therewith, a series of balloting shifters for throwing said actuating mechanism out of operative relation with the corresponding registers, restoring and locking means for said balloting shifters and motor devices for said actuating mechanism and said locking means arranged to operate said actuating means first, both when the voter approaches and when he leaves the machine.

38. In voting machines, the combination with the series of vote registers, of a series of actuators normally in operative relation therewith, a series of balloting shifters for throwing said actuators out of operative relation with said register, reciprocating bars for advancing and retracting said registers, reciprocating bars for releasing and restoring said shifters and operating mechanism for said bars arranged to shift said actuator bars first, both when the voter approaches and when he leaves the machine.

39. In voting machines, the combination with the series of vote registers, of a series of rotary actuators normally in operative relation therewith, means for oscillating said actuators to advance and retract said registers and a series of balloting shifters under the voter's control for preventing the retraction of the corresponding registers.

40. In voting machines, the combination with the series of vote registers, of a series of rotary actuators therefor, means for oscillating said rotary actuators to advance and retract said registers, a series of balloting shifters for moving said actuators to prevent the restoration of the corresponding registers and interlocking mechanism for preventing the operation of more than a predetermined number of balloting shifters.

41. In voting machines, the combination of the vote register and an actuator normally in operative relation therewith, one of said parts being movable forward and back to advance and retract said register, and one of said parts being shiftable out of operative relation with the other during such backward movement, whereby the register is left in permanently advanced position, and means for simultaneously operating all of said counters and their actuators forward and back.

42. In voting machines, the combination of a set of vote registers, a set of actuators therefor normally in operative relation therewith, means for moving one of said sets forward and back to advance and retract said registers, of a series of balloting shifters for throwing said parts out of operative relation during the backward movement of the shiftable set, whereby the registers corresponding to the operated balloting shifters are left in permanently advanced position, and means for simultaneously operating all of said counters and their actuators forward and back.

43. In voting machines, the combination of a set of vote registers, a set of actuators normally in operative relation therewith, operating mechanism for simultaneously shifting all of said actuators back and forth in one direction to advance and retract said registers, a series of balloting shifters for moving said actuators back and forth in another direction into and out of operative relation with said registers, means for preventing the operation of said shifters until after the forward movement of said actuators and interlocking mechanism for preventing the operation of more than a predetermined number of said balloting shifters.

44. In voting machines, the combination of a set of vote registers, a set of actuators therefor normally in operative relation therewith, actuating mechanism for shifting one of said sets forward and back to advance and retract said registers, a series of balloting shifters for moving one of said sets out of and into operative relation with the other set, and means for preventing the operation of said shifters until after the forward movement of said movable set.

45. In voting machines, the combination of a set of vote registers, a set of rotary actuators therefor, actuating mechanism for oscillating said actuators forward and back to advance and retract said registers, a series of balloting shifters for longitudinally moving said actuators out of operative relation with said registers, means for preventing the operation of said shifters until after the forward movement of said actuators, interlocking mechanism for preventing the operation of more than a predetermined number of said balloting shifters and means for restoring said actuators and shifters.

46. In voting machines, the combination of a set of vote registers and a set of actuators relatively shiftable out of and into operative relation, but at all times interlocked with each other, one of said sets being shiftable forward and back relatively to the other set to advance and retract said registers, and a series of balloting shifters for moving one of said sets out of operative relation with the other during the return or restoring movement.

47. In voting machines, the combination of a set of vote registers, a set of rotary actuators interlocked and normally in operative relation therewith, mechanism for moving said actuators forward and back to advance and retract said registers, a set of balloting shifters for moving said actuators out of operative relation with said registers to prevent the retraction of the registers whose corresponding shifters have been operated and interlocking mechanism for preventing the operation of more than a predetermined number of balloting shifters.

48. In voting machines, the combination of a set of vote registers having Geneva-stop movement intermittent gears, a set of rotary Geneva-stop movement actuators interlocked with said gears and normally in operative relation therewith, means for rotating said actuators forward and back to advance and retract said registers and a set of balloting shifters for moving said actuators out of operative relation with the corresponding registers, means for preventing the operation of said shifters until after the forward movement of said actuators and interlocking mechanism for preventing the operation of more than a predetermined number of said shifters.

49. In voting machines, the combination of a vote register, of an actuator interlocked with said register, said register having an intermittent gear and said actuator having a tooth for actuating said gear normally in operative relation therewith and a half tooth at the end of said actuating tooth, said actuator being shiftable to throw said actuating tooth out of operative relation with said gear.

50. In voting machines, the combination of the vote register having a Geneva-stop movement intermittent gear, of a cylindrical actuator interlocked with said gear and provided with a Geneva-stop movement tooth for actuating said gear normally in operative relation therewith, said cylindrical actuator having cut-away spaces on opposite sides and at the end of said actuating tooth and a half tooth in the cut-away space at the end of said actuating tooth, means for rotating said actuator forward and back to advance and retract said register and means for shifting said actuator after its advance movement to throw its actuating tooth out of operative relation with said gear, whereby the restoring movement of said actuator will not retract said register.

51. In voting machines, the combination with a vote register or counter, of a rotary actuator therefor, a rotary balloting shifter, connections between said shifter and said actuator for moving the latter longitudinally into voted position, operating mechanism for rotating said actuator independently of said shifter to rotate said register and restoring mechanism for said shifter and actuator.

52. In voting machines, the combination with a vote register or counter, of a rotary actuator therefor, a rotary shifter, a slide for shifting said actuator into and out of voted position, a cam on said rotary shifter for operating said slide, means independent of said shifter for oscillating said actuator to operate said register and a restoring device engaging said shifter to return said parts to normal position.

53. In voting machines, the combination with a register, of a rotary actuator therefor, a rotary shifter whereon said actuator is loosely mounted, a slide connected to said actuator to move the same longitudinally into and out of voted position, a cam on said shifter for engaging and operating said slide, an actuator-bar for operating said actuator independently of said slide and shifter and a restoring-bar engaging said shifter to return the parts to normal position.

54. In voting machines, the combination with a vote register or counter, of an oscillating key-operable shifter for controlling the operation of said register and a face plate having a key-hole in front of said shifter and arranged to interlock with the shifter operating-key to compel a full stroke movement thereof.

55. In voting machines, the combination with the vote register or counter, of a rotary key-actuated shifter controlling the operation of said register, a face plate having an opening therein, and an indicator on said shifter behind said plate movable into and out of register with said opening.

56. In voting machines, the combination with a vote register or counter, an actuator therefor, a rotary key-actuator shifter for moving said actuator into and out of voted position, a face plate having a key-hole in front of said shifter constructed to interlock with the shifter operating-key to compel a full stroke movement thereof, said face plate also having an opening adjacent said key-hole and an indicator on said shifter behind said face plate movable with the shifter into and out of register with said opening.

57. In voting machines, the combination with a series of voting devices arranged in office groups, of an actuating-bar for each group, operating rock-shafts for said bars, a common bar connecting said rock-shafts and a motor shaft for operating said common connecting-bar.

58. In voting machines, the combination with the series of vote registers arranged in office groups, rotary actuators for said registers and an operating-bar for each group of actuators, rock-shafts connected to said bars, arms on said rock-shafts, a common connecting-bar engaging said arms and a motor shaft for operating said connecting-bar.

59. In voting machines, the combination with the series of vote registers or counters and with the actuators therefor normally interlocked therewith, but releasable therefrom on excessive movement to permit the return of said registers to zero, a common operating-bar for said actuators and motor devices of definite throw for operating said bar, said motor devices being releasable from said bar to permit excessive movement thereof and of the actuators controlled thereby.

60. In voting machines, the combination with the series of vote registers or counters and with a set of actuators therefor normally interlocked therewith but releasable therefrom on excessive movement, of an operating-bar for said actuators, motor devices of definite throw, connections between said motor devices and said bar and a city clerk's lock normally preventing the disengagement of said connections.

61. In voting machines, the combination with the series of vote registers arranged in groups and with actuators therefor normally interlocked therewith but releasable therefrom on excessive movement, of a set of reciprocating bars for operating the actuators of the several groups, operating rock-shafts for said bars, a motor shaft of definite throw, releasable connections between said motor shaft and said rock-shafts, a city clerk's lock and means under control of the city clerk's lock for normally preventing the release of said connections.

62. In voting machines, the combination of the series of unit frames or sections grouped together, an office group of vote registers, actuators therefor and an actuator operating-bar in each of said sections, rock-shafts for operating said bars, arms on said rock-shafts, a notched connecting-bar engaging said arms, a motor shaft of definite throw engaging said connecting-bar, a city clerk's lock and means under control of the city clerk for permitting the removal of said connecting-bar.

63. In voting machines, the combination with the series of vote registers or counters, of a series of rotary balloting shifters controlling the operation of said counters, arms on said shifters and a common restoring-bar having lugs to engage said arms.

64. In voting machines, the combination with the series of vote registers or counters, and with the actuators therefor, of a series of rock-shafts or balloting shifters for moving said actuators into and out of voted position, arms on said rock-shafts, a series of restoring and locking-bars having lugs engaging said arms, a motor shaft and connections between said motor shaft and said bars.

65. In voting machines, the combination with a series of unit frames or sections grouped together, an office group of vote registers or counters in each of said sections, rock-shafts or balloting shifters controlling the operation of said registers, arms on the projecting ends of said shafts, reciprocating restoring and locking bars extending across said sections and having lugs engaging said arms, a motor shaft, and connections between said shaft and said bars.

66. In voting machines, the combination with a series of vote registers and with the actuators therefor, of a set of reciprocating bars for operating said actuators, a series of balloting shifters for moving said actuators into and out of voted position, a set of locking and restoring bars, a pair of slides, one connected to said set of actuating bars and one to said locking and restoring bars and a motor shaft arranged to successively operate said actuating slide and said restoring slide as the voter is admitted to, and as he leaves the machine.

67. In voting machines, the combination with a series of vote registers and with the actuators therefor, of a set of reciprocating bars for operating said actuators, a series of balloting shifters for moving said actuators into and out of voted position, a set of locking and restoring bars, a pair of slides, one connected to said set of actuating bars and one to said locking and restoring bars, a motor shaft, means for preventing the movement of said shaft in one direction and tappets on said shafts for operating said slides, said actuating slide tappet being in advance of said restoring slide tappet.

68. In voting machines, the combination of a series of unit sections or frames grouped together, an office group of voting mechanisms in each of said sections comprising counters, counter actuators and rotary actuator shifters, rock-shafts in each of said sections connected to said actuators, an end section, a pair of slides in said end section, a rock-shaft operated by one of said slides, a common connecting-bar detachably connecting the rock-shaft with the rock-shafts of the unit sections, a series of rock-shafts operated by the other of said slides, a series of restoring bars detachably connecting the last mentioned rock-shafts with the rotary shifters of said unit sections, and a motor shaft journaled in said end section for operating said slides.

69. In voting machines, the combination with a series of balloting shifters movable into and out of operative position, of a common actuating device for said shifters operative to move the same into and out of voted position and to restore and lock said shifters when operated either independently or together.

70. In voting machines, the combination with a series of balloting shifters movable into and out of voting position, of an actuating device common to said shifters and operative to move the same into and out of voted position, a straight ticket balloting shifter for operating said actuating device and motor mechanism for operating said actuating device to restore and lock said shifters.

71. In voting machines, the combination with a series of balloting shifters movable into and out of voting position, of a combined straight ticket, restoring and locking bar for said shifters, a party vote balloting shifter for operating said bar, motor devices and means operated thereby for effecting the restoring and locking movement of said bar, said means being shiftable by the motor mechanism to release said bar as the voter is admitted to the machine.

72. In voting machines, the combination with a series of balloting shifters movable into and out of voting position, of a common actuating device having lost motion connections with said shifters and operated to move the same into and out of voted position, a straight ticket balloting shifter for operating said actuating device and a restoring and locking member having a one-way connection with said actuating device and operative to restore and lock said device and said shifters and to release the same.

73. In voting machines, the combination with a series of balloting shifters arranged in groups representing different party tickets, said shifters being movable into and out of voting position, of a set of straight ticket bars, one for each of said groups having lost motion connections with said shifters and operative to move the same into and out of voted position, party vote balloting shifters for operating said bars, a restoring and locking member having one-way connections with said bars and shiftable in opposite directions to restore and lock said bars as the voter leaves the machine and to release the same as the voter is admitted, and motor mechanism controlling the operation of said member.

74. In voting machines, the combination with a series of rotary balloting shifters, eccentric or off-set pins connected to said shifters, a reciprocating-bar common to all of said shifters having lugs spaced apart on opposite sides of said pins, a straight ticket balloting shifter connected to said bar and a member shiftable in one direction to restore and lock said bar and shifters and in the opposite direction to release the same.

75. In voting machines, the combination with a series of vote registers, of rotary actuators therefor, of rotary shifters for moving said actuators into and out of voted position, tumbler heads on said shifters having off-set or eccentric pins, a reciprocating-bar having lugs spaced apart on opposite sides of said pins, a rotary straight ticket ballot shifter connected to said bar, an arm on said straight ticket shifter and a slide in one-way engagement with said arm and shiftable in one direction to restore and lock said bar and shifters and in the opposite direction to release the same.

76. In voting machines, the combination with a series of vote registers, of a corresponding series of actuators at all times interlocked therewith, mechanism for effecting the operative movement of said actuators in one direction, said actuators being movable in another direction by the voter into and out of operative position and an actuating device common to all of said actuators operative to shift the same into and out of voted position.

77. In voting machines, the combination with a series of vote registers, of a corresponding series of actuators at all times interlocked therewith, individual balloting shifters for throwing said actuators into and out of operative relation with said registers, an actuating device common to said actuators and operative to throw the same into and out of voted position, a party ticket balloting shifter for operating said actuating device and a member operative to restore said device and actuators to normal, unvoted position.

78. In voting machines, the combination with a series of vote registers, of a series of individual actuators therefor movable by the voter into and out of operative position, operating mechanism for said actuators, a combined straight ticket, restoring and locking device common to said actuators and operative to shift the same into and out of voted position, a member shiftable in one direction to effect the restoring and locking movement of said device and in the other direction to release the same and means for shifting said actuator mechanism and said member in succession, both as the voter approaches and as he leaves the machine.

79. In voting machines, the combination with the series of registers arranged in groups representing different party tickets, of a corresponding series of rotary actuators therefor, a series of individual balloting shifters for moving said actuators longitudinally into and out of operative position with said registers, a set of combined straight ticket, restoring and locking bars, one for each group, operative to move said shifters and actuators into and out of voted position, straight ticket balloting shifters for operating said bars, a member coöperating with said bars and shiftable in one direction to restore and lock said shifters and in another direction to release the same, mechanism for operating said actuators and motor devices for moving said actuating mechanism and said member successively, both as the voter approaches and as he leaves the machine.

80. In voting machines, the combination with a series of rotary balloting shifters having off-set portions or arms, a reciprocating lock-out bar and a series of pivoted lock-out pawls on said bar for engaging the off-set portions of said shifters, said pawls being movable on said bar into and out of operative position.

81. In voting machines, the combination with a series of balloting shifters arranged in rows representing different party tickets, of a shiftable lock-out bar, one for each of said rows, a series of lock-out pawls on said bars, one for each of said shifters, said pawls being movable on said bars into and out of operative position and a common shiftable member whereon said bars are mounted.

82. In voting machines, the combination with the series of rotary balloting shifters arranged in groups representing different party tickets and having eccentric or off-set pins, a series of locking bars, one for each of said groups having lugs engaging said pins, the variably shiftable slotted slide and studs on said bars engaging the slots of said slide, said slots normally permitting the shift of said bars but arranged to lock out all but one of said bars when said slide is shifted.

83. In voting machines, the combination of a pair of rotary balloting shifters for voting on amendments, having oppositely disposed off-set or eccentric lugs and a cross connecting link extending between said lugs, said link having a slotted connection with one of said lugs whereby only one of said shifters may be operated.

84. In voting machines, the combination of a pair of rotary balloting shifters having cross arms or tumbler heads provided with eccentric pins and a cross connecting link extending between pins on opposite ends of said cross arms, said link having a slot through which one of said pins extends.

85. In voting machines, the combination of a group of balloting shifters for voting on candidates, a pair of balloting shifters associated with said group for voting on amendments, said shifters being movable into and out of voted position and a member common to all of said shifters operative to move said group of candidate shifters into and out of voted position, but only operative to restore said amendment shifters to normal position.

86. In voting machines, the combination of a group of balloting shifters for voting on candidates in a party ticket, a pair of balloting shifters associated with said group for voting on amendments, all of said shifters being movable into and out of voted position, an actuating device common to all of said shifters and operative to move said candidate shifters into voted position and to restore the same, but only operative to restore said amendment shifters, a straight ticket balloting shifter and restoring mechanism for operating said actuating device.

87. In voting machines, the combination of a group of rotary shifters, two for voting on amendments and the remainder for voting on the condidates in a party ticket, said shifters being movable into and out of voted position and having eccentric or off-set pins, a combined straight ticket and restoring-bar having lugs extending between said pins to move said candidate shifters into and out of voted position as said bar is operated, the lug between the pins of said amendment section having a lost motion or pin-and-slot connection with said bar, whereby said bar and lugs are only operable to restore said amendment shifters to normal position, a straight ticket balloting indicator and restoring mechanism for operating said bar.

88. The combination in a voting machine of voting devices arranged in party lines and office rows, a plate connecting two voting devices in one party line with one voting device in another party line, securing the simultaneous operation of all of said connected voting devices.

89. The combination in a voting machine of voting devices arranged in party lines and office rows, means connecting a plurality of voting devices in one party line with a voting device in another party line, securing the simultaneous operation of all of said connected voting devices.

90. In voting machines, the combination with two or more vote registers all representing a single candidate, of key operated rock-shafts for controlling the operation of said registers, arms on said shafts and a rigid connection between said arms.

91. In voting machines, the combination with the rows of vote registers arranged in different party tickets, of a series of rock-shafts operable by the voter for controlling the operation of said registers and an indorsement device comprising a rigid member connecting at least three of said shafts, two of which are arranged in the same row but in different party tickets, and the third in an adjacent row.

92. In a voting machine, the combination of counters, actuators therefor, said actuators being capable of driving said counters forward and backward with each operation of the machine, means for simultaneously operating all of said actuators to drive their counters forward, each of said actuators having a movement independent of its counter whereby the backward movement of its counter is prevented.

93. In a voting machine the combination of a number of groups of individual keys, one group for each party ticket, a series of straight ticket keys each arranged to move one group of individual keys to voted position but permitting them to be moved to voted position without moving said straight ticket keys and an auxiliary interlock for said party levers for preventing the movement of any straight ticket key to voted position when individual keys in two or more party groups have been operated.

94. A voting machine including individual actuators, in party and office columns, an interlock for the same, straight ticket actuators, one for each party, which when operated operates the individual actuators of each party group and cam blocks and wedges forming an interlock between said straight ticket actuators, the individual interlocking mechanisms being arranged to permit splitting the vote among the parties if desired and the straight ticket interlock preventing the operation of a straight ticket actuator after a split vote has been cast, or another straight ticket voted, and thus preventing the strain of a pulled straight ticket actuator to be exerted on the individual actuators or individual interlocks.

JAMES H. DEAN.

Witnesses:
 HARRY L. CLAPP,
 LILLIAN PRENTICE.